H. H. CANNON.
MACHINE FOR MAKING SNAP FASTENERS.
APPLICATION FILED APR. 24, 1922.

1,436,476.

Patented Nov. 21, 1922.

INVENTOR:
Henry H. Cannon.
BY
ATTORNEYS.

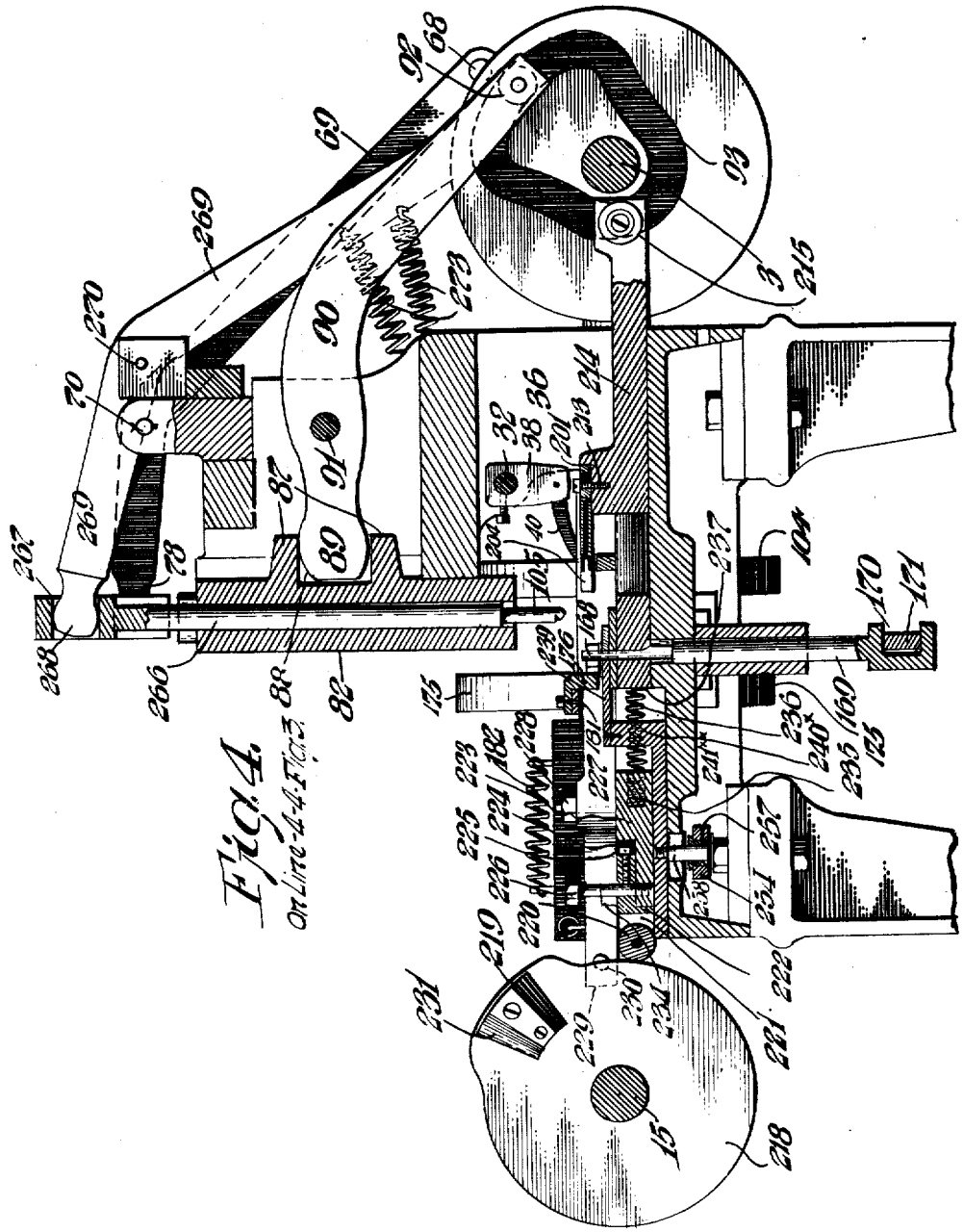

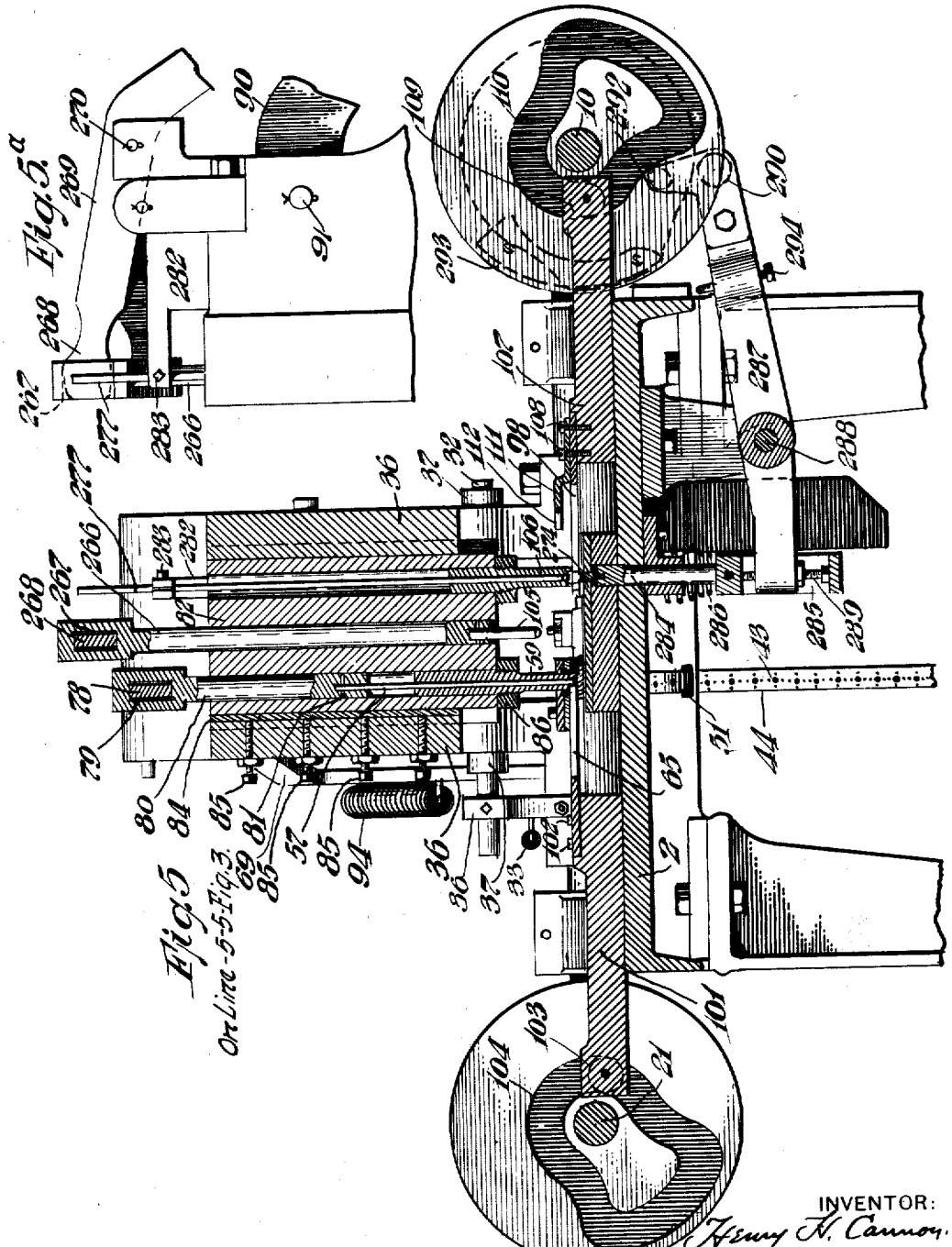

H. H. CANNON.
MACHINE FOR MAKING SNAP FASTENERS.
APPLICATION FILED APR. 24, 1922.
1,436,476.
Patented Nov. 21, 1922.
18 SHEETS—SHEET 6.
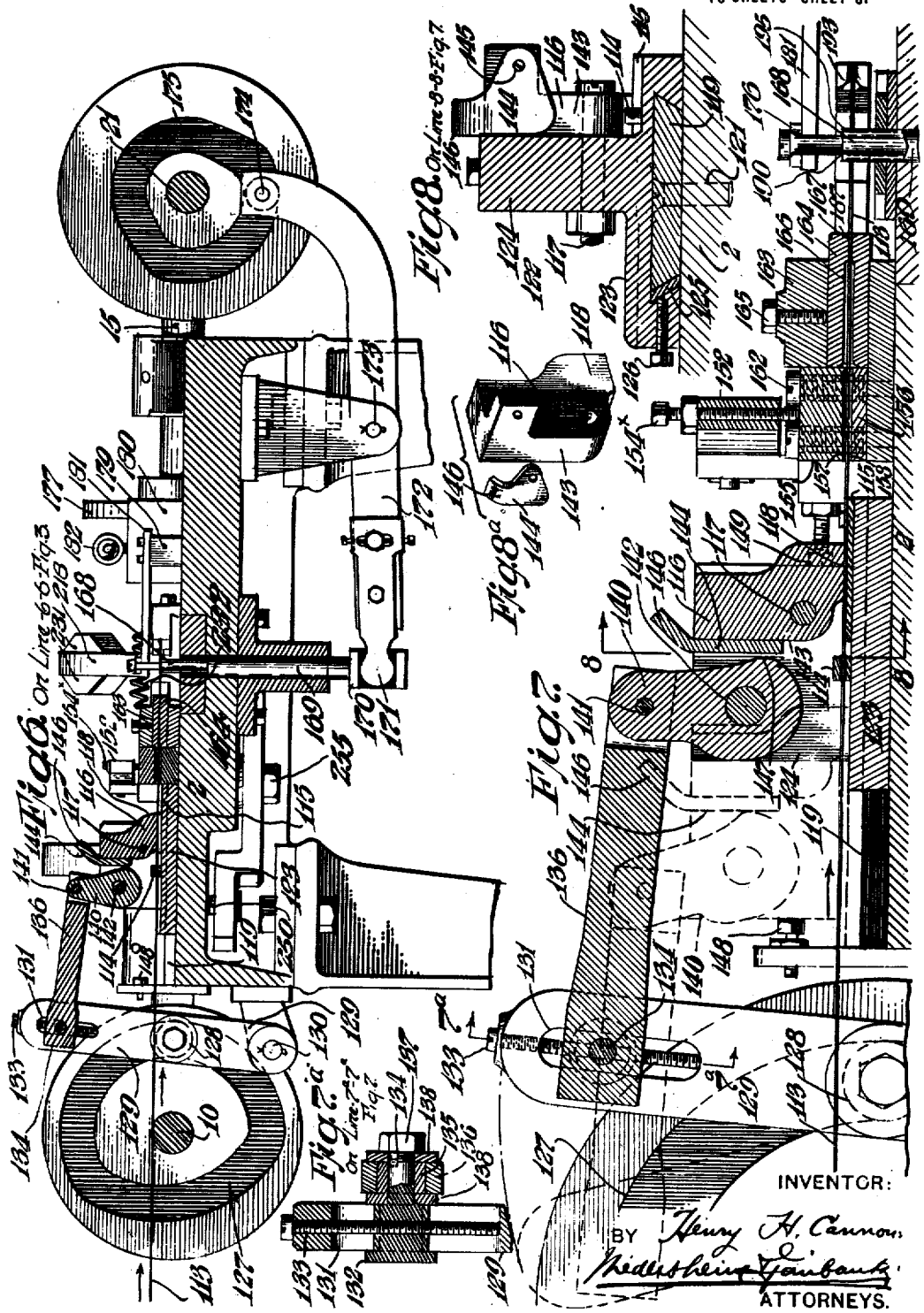
INVENTOR:
Henry H. Cannon,
BY
ATTORNEYS.

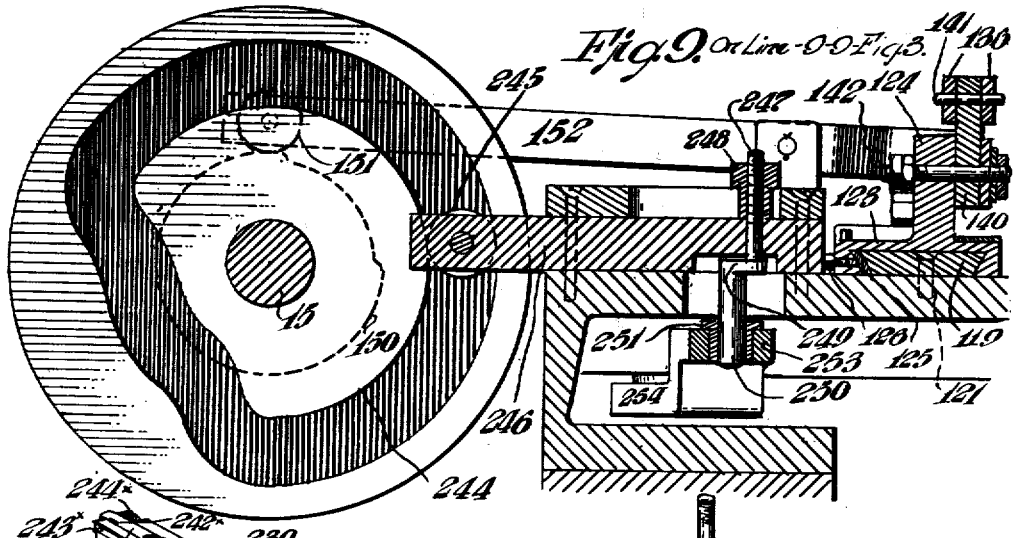
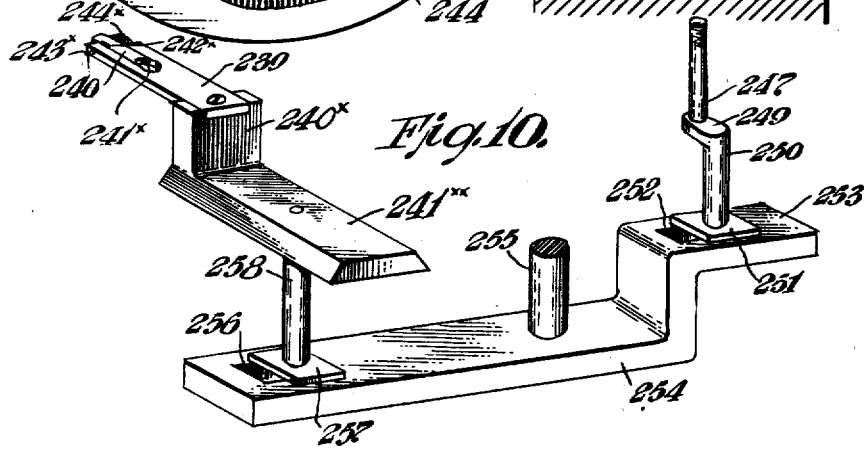
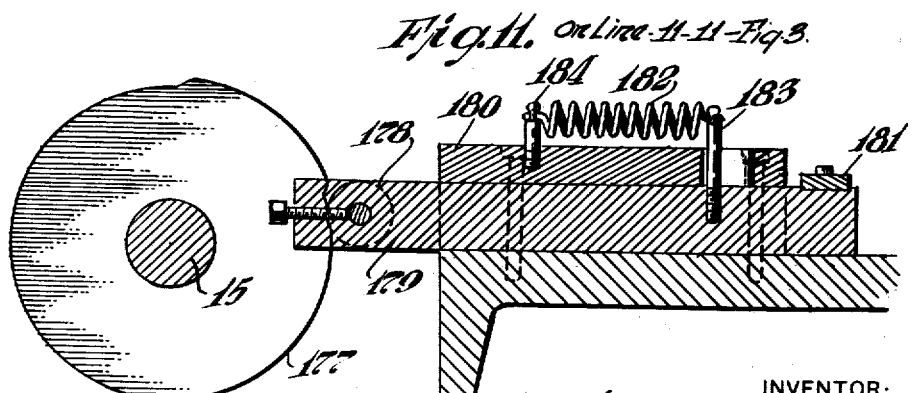

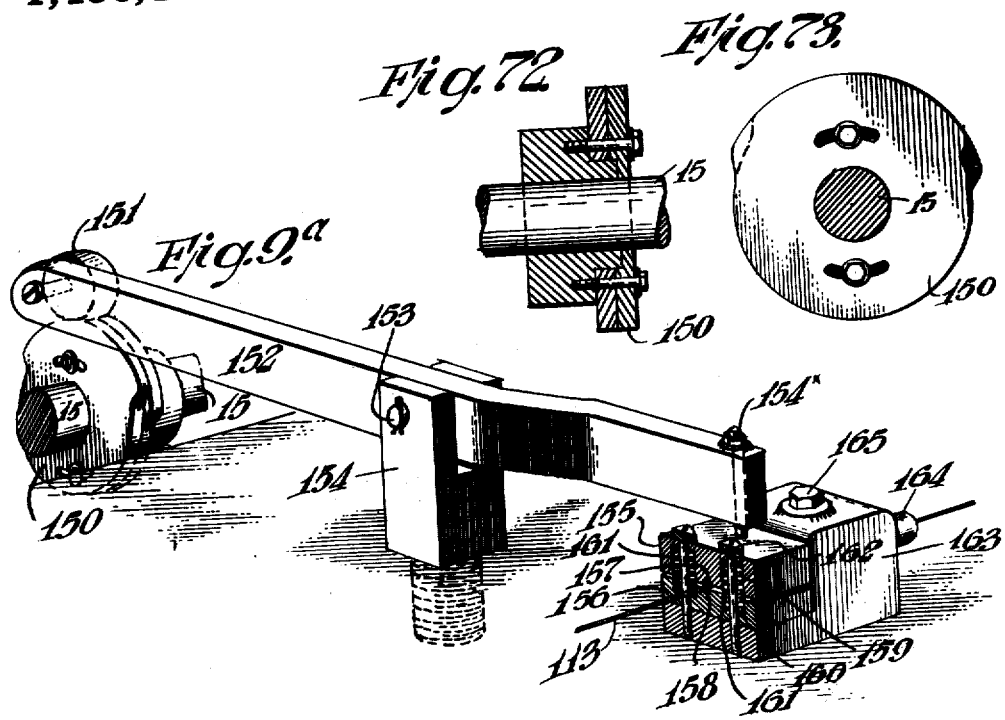

H. H. CANNON.
MACHINE FOR MAKING SNAP FASTENERS.
APPLICATION FILED APR. 24, 1922.
1,436,476.
Patented Nov. 21, 1922.
18 SHEETS—SHEET 9.
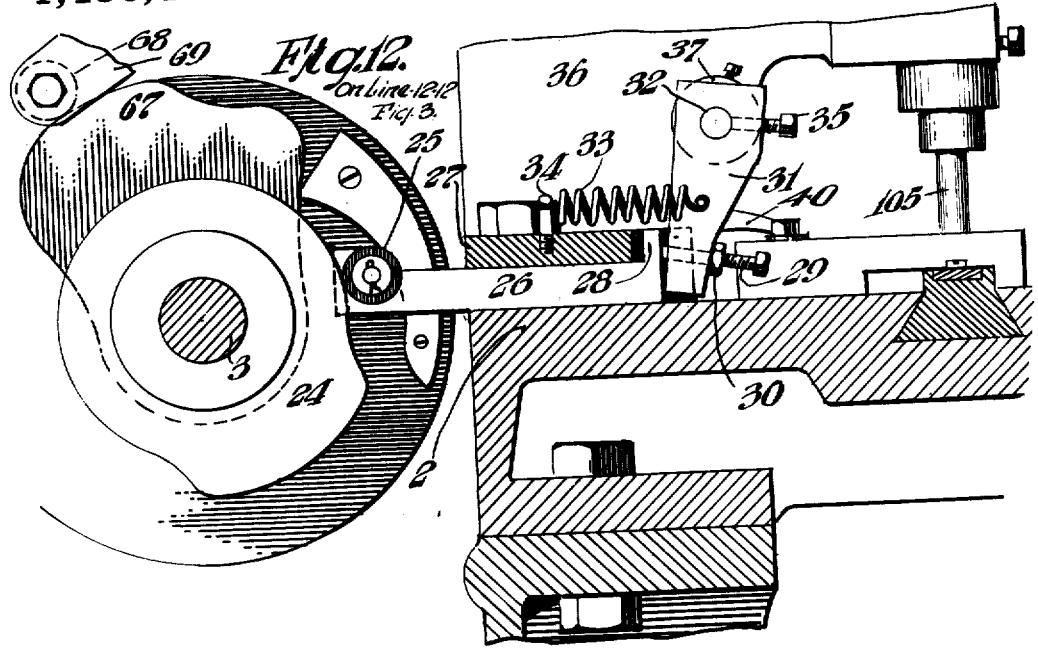
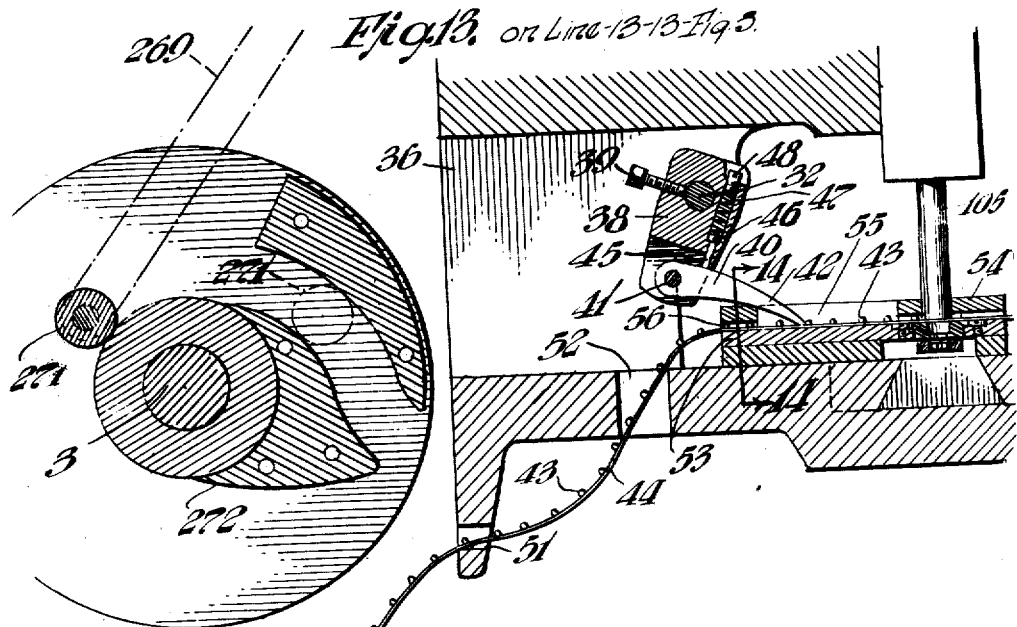
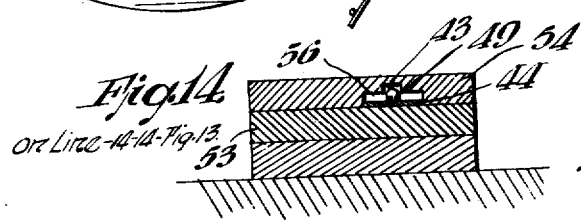
INVENTOR:
Henry H. Cannon.
BY
ATTORNEYS.

H. H. CANNON.
MACHINE FOR MAKING SNAP FASTENERS.
APPLICATION FILED APR 24, 1922.
1,436,476.
Patented Nov. 21, 1922.
18 SHEETS—SHEET 10.
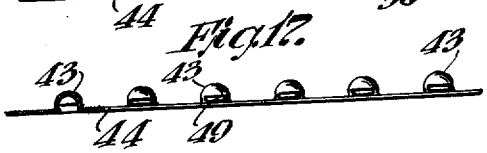
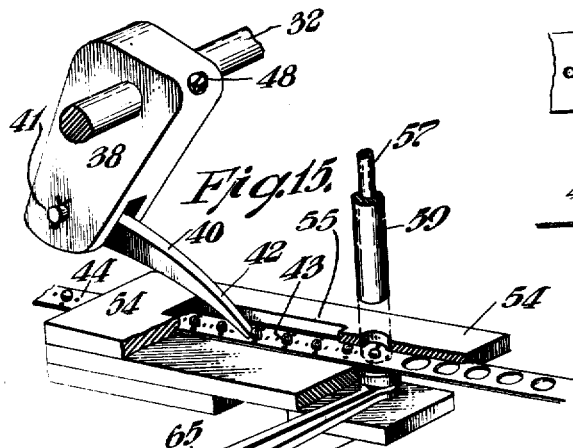
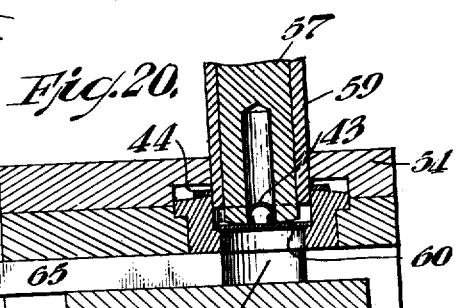
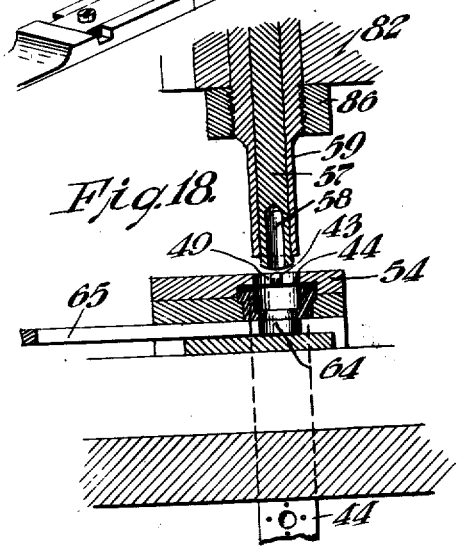
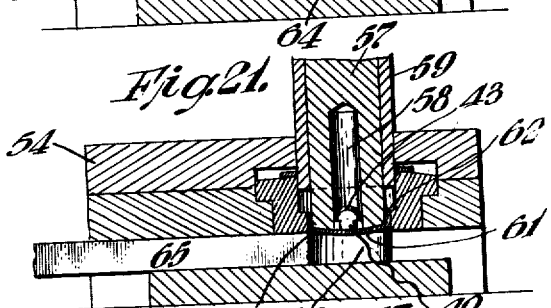
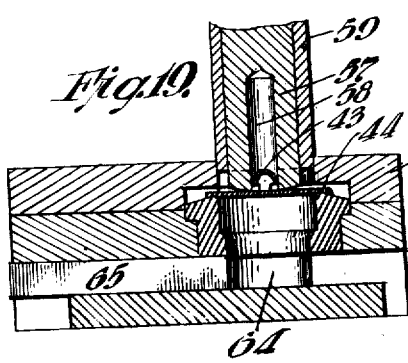
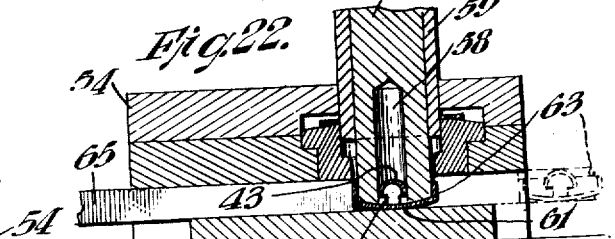
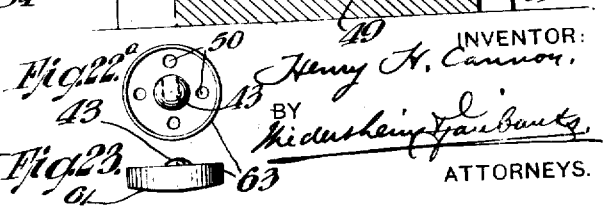
INVENTOR:
Henry H. Cannon,
BY
ATTORNEYS.

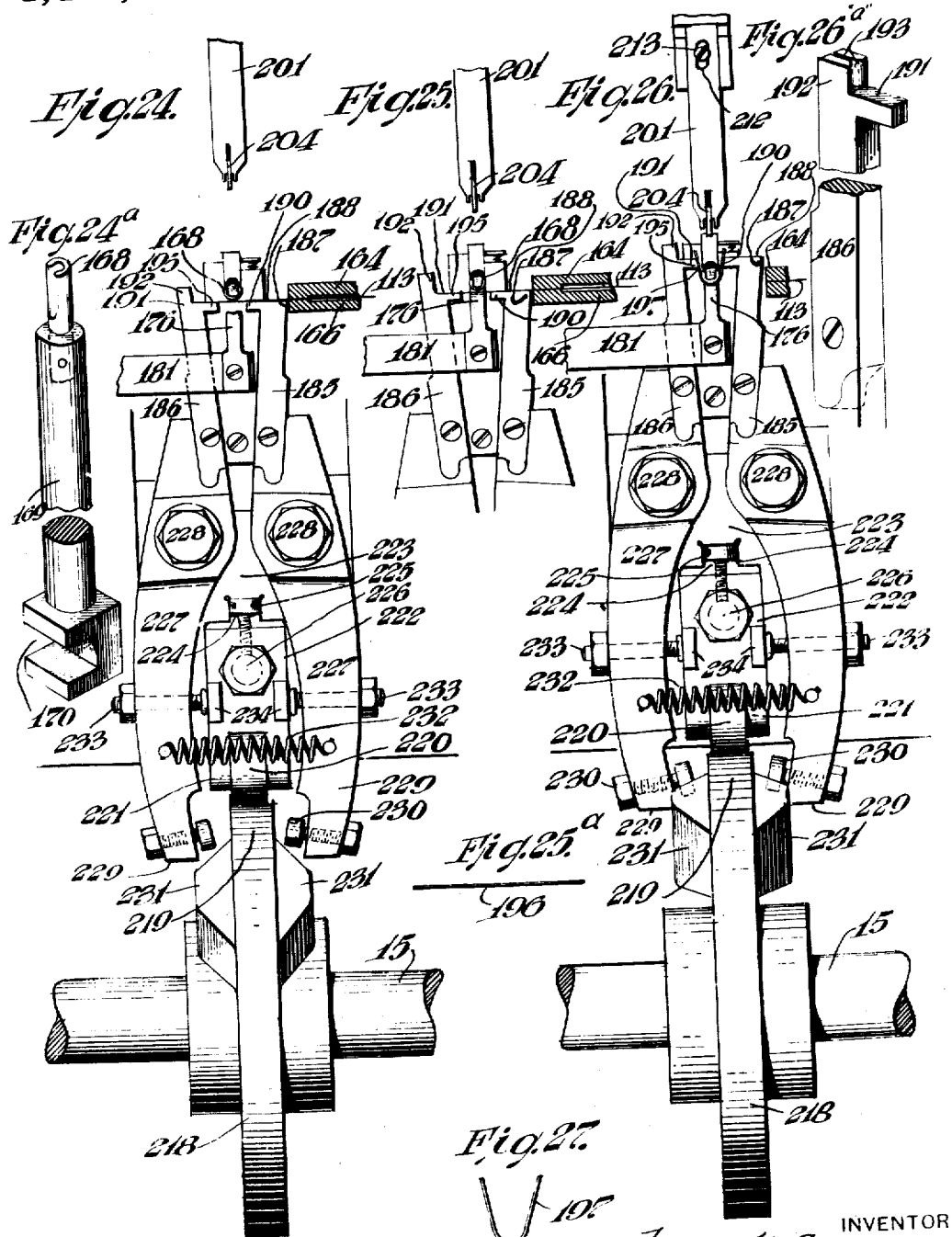

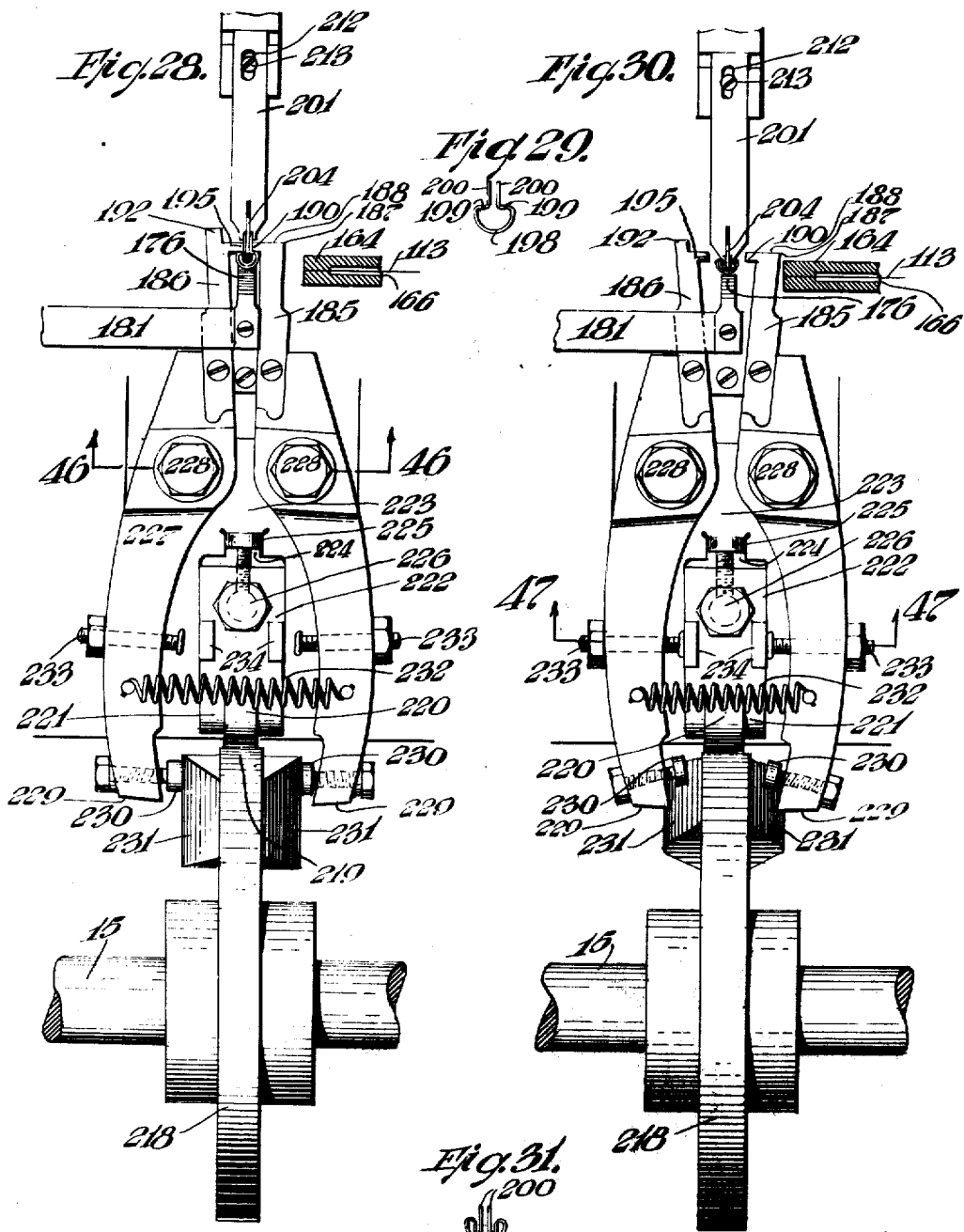

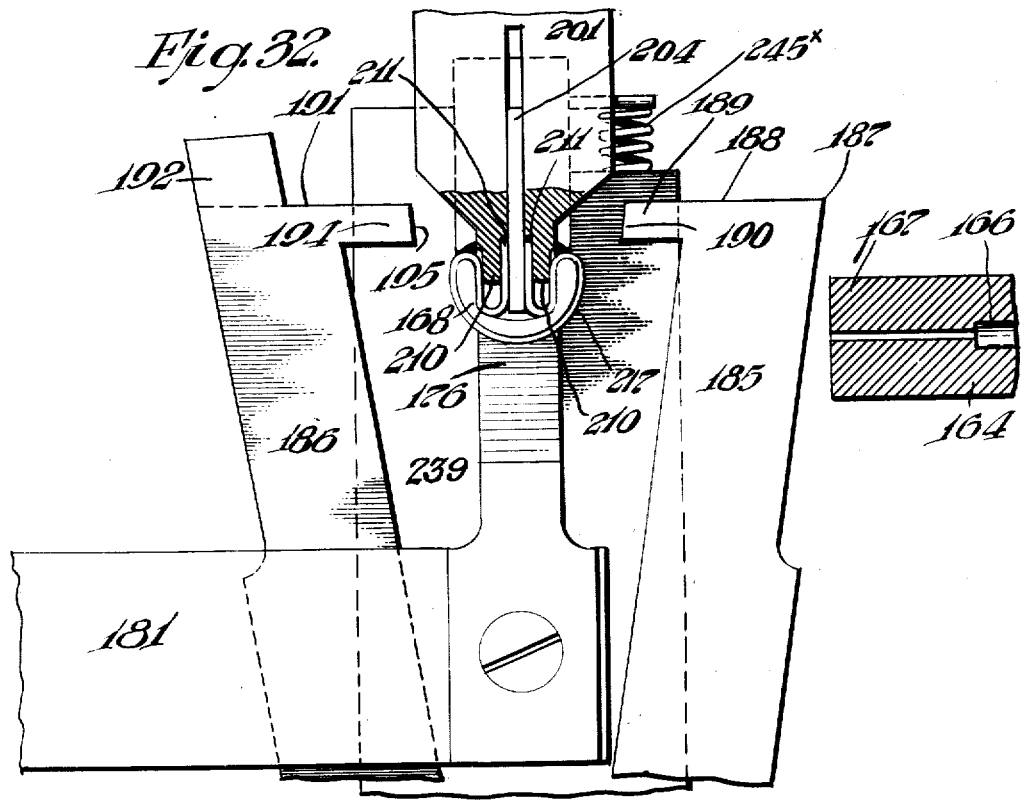
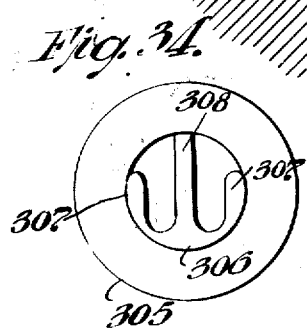
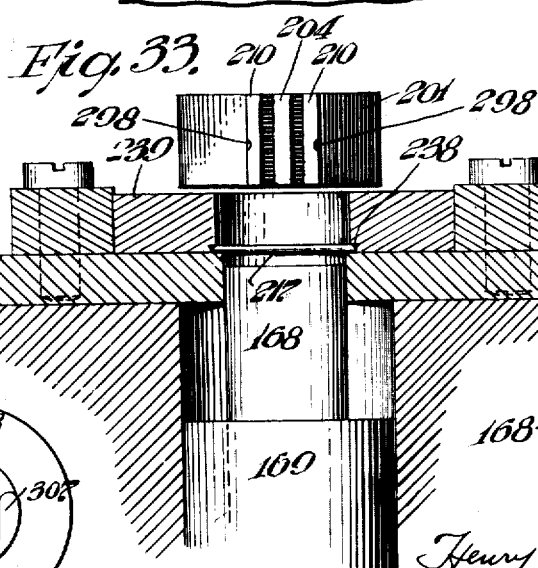

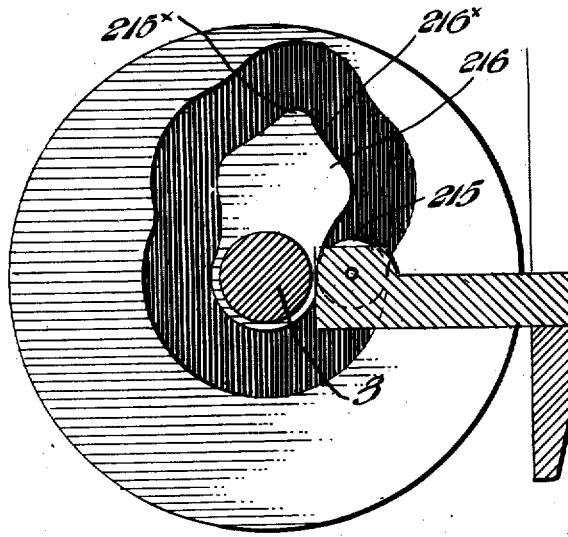
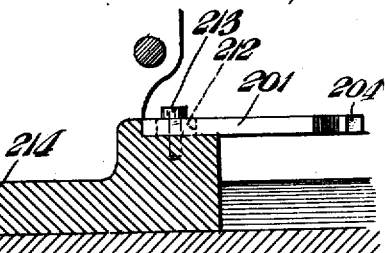
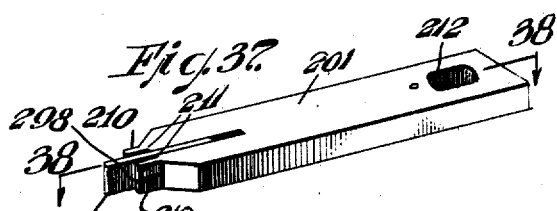
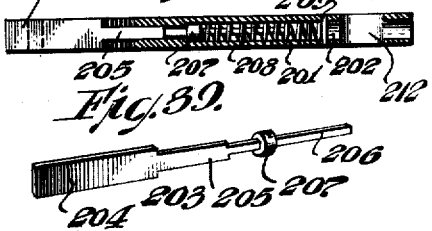
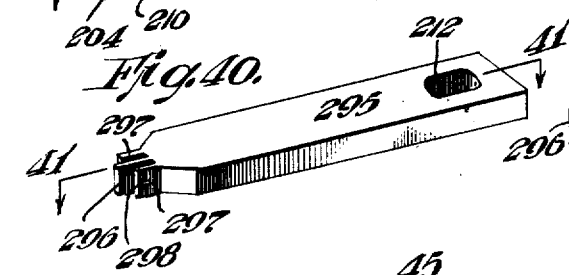
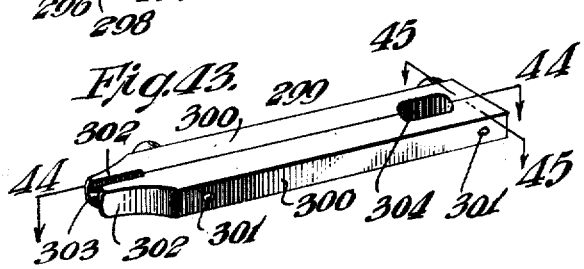

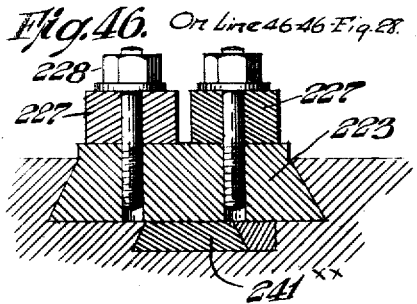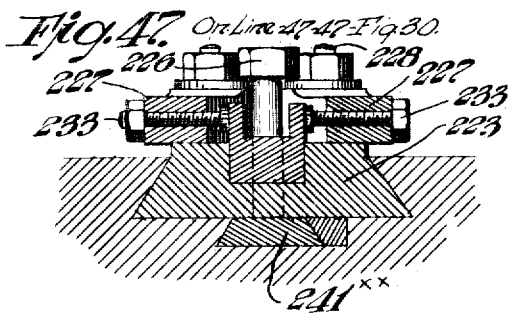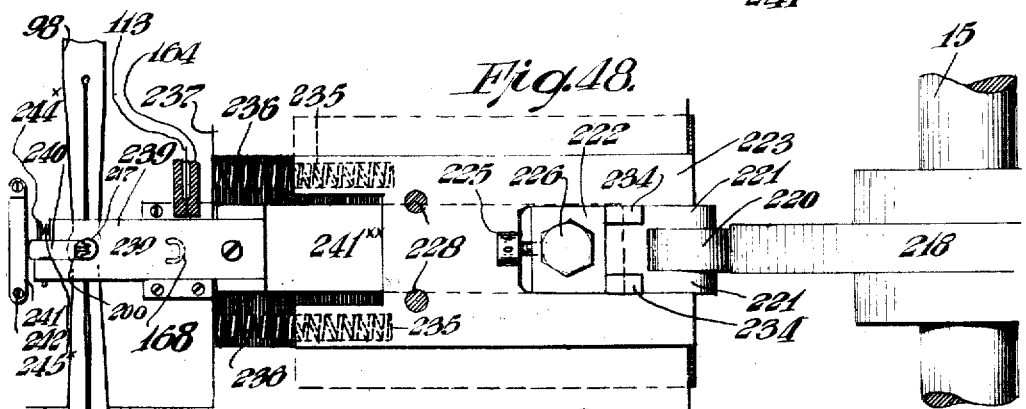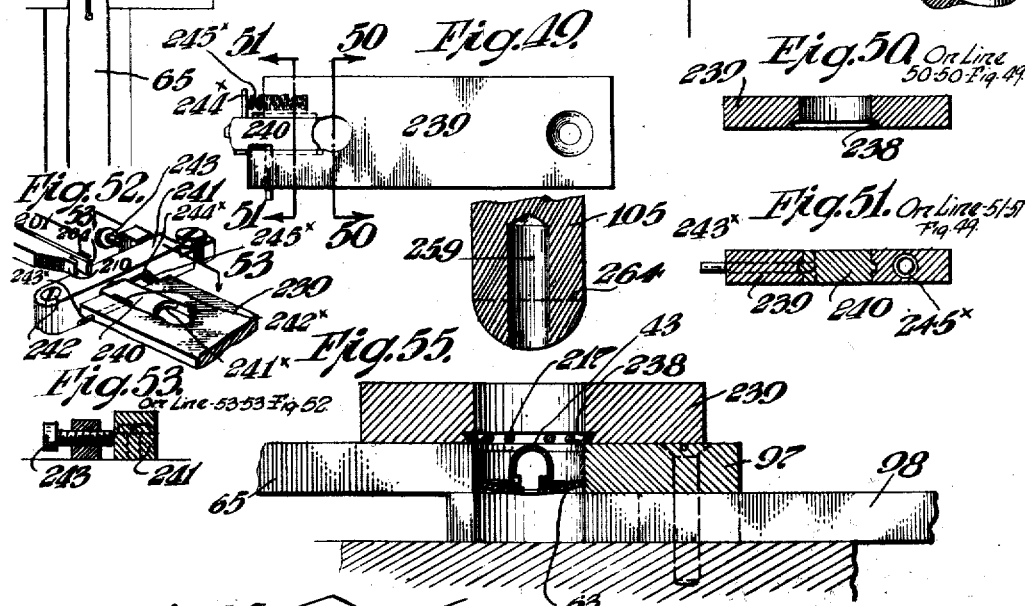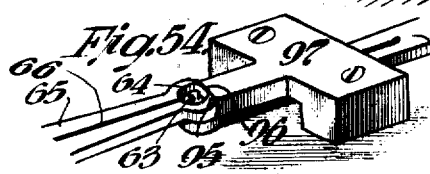

H. H. CANNON.
MACHINE FOR MAKING SNAP FASTENERS.
APPLICATION FILED APR. 24, 1922.
1,436,476.
Patented Nov. 21, 1922.
18 SHEETS—SHEET 16.
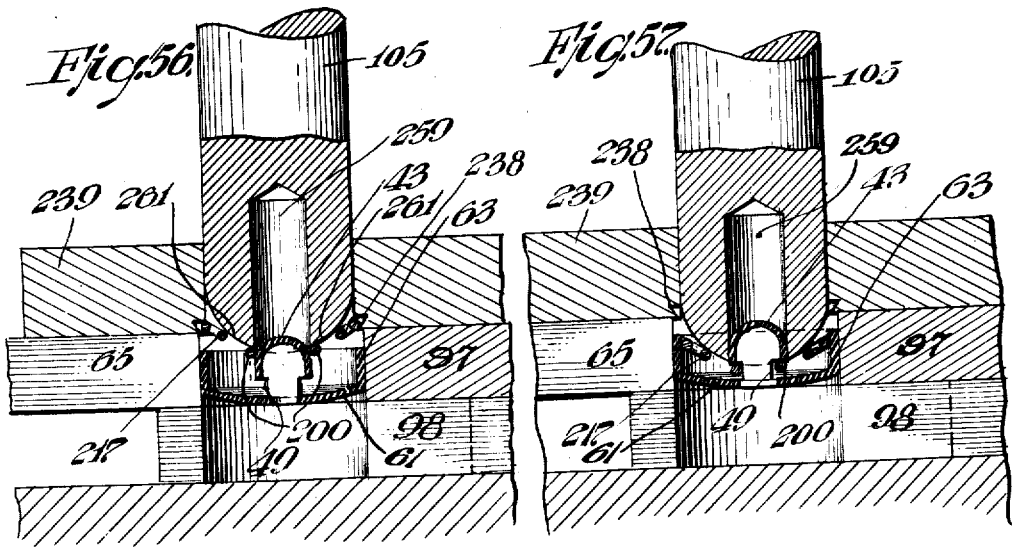
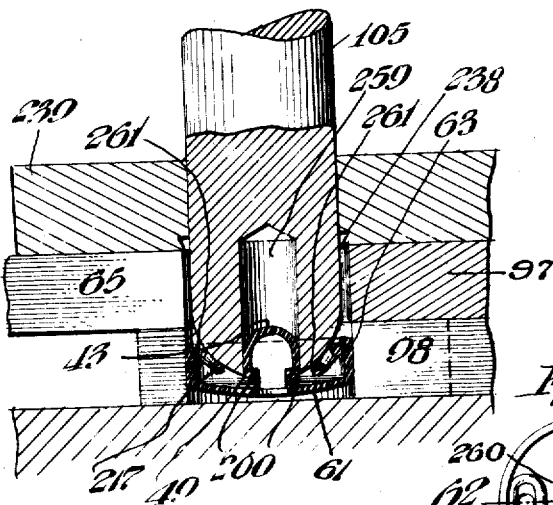
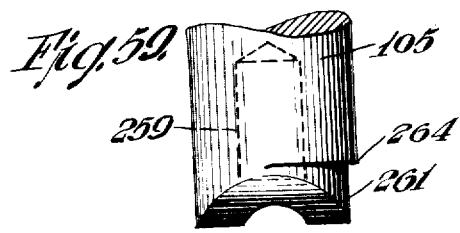
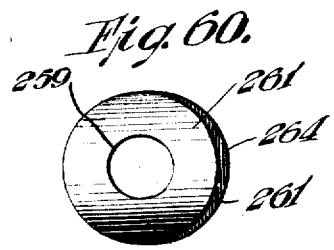
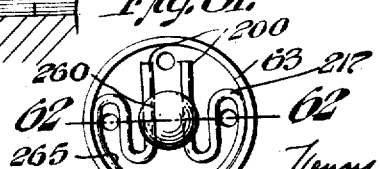
INVENTOR:
Henry H. Cannon.
BY
ATTORNEYS.

H. H. CANNON.
MACHINE FOR MAKING SNAP FASTENERS.
APPLICATION FILED APR. 24, 1922.
1,436,476.
Patented Nov. 21, 1922.
18 SHEETS—SHEET 17.
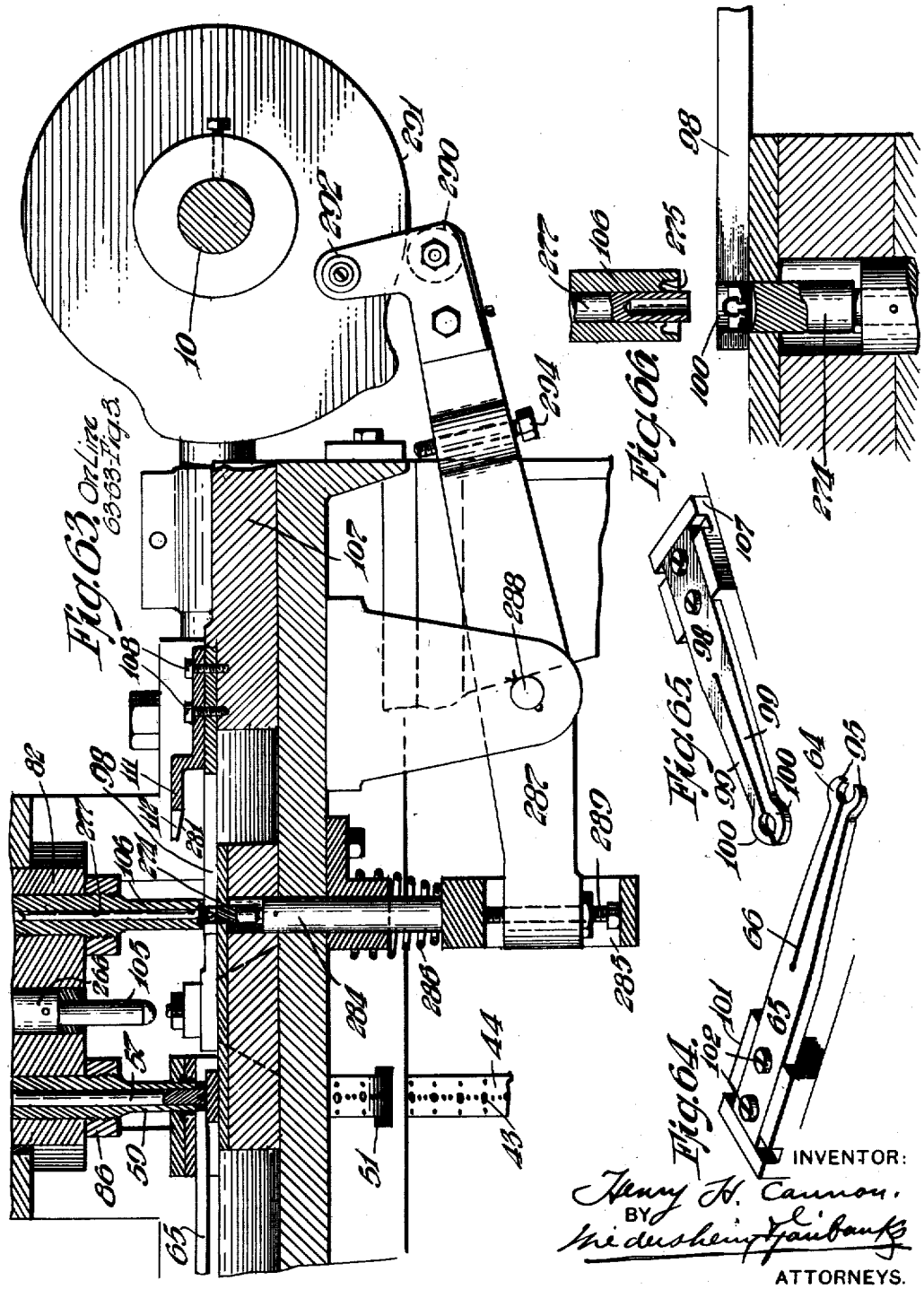

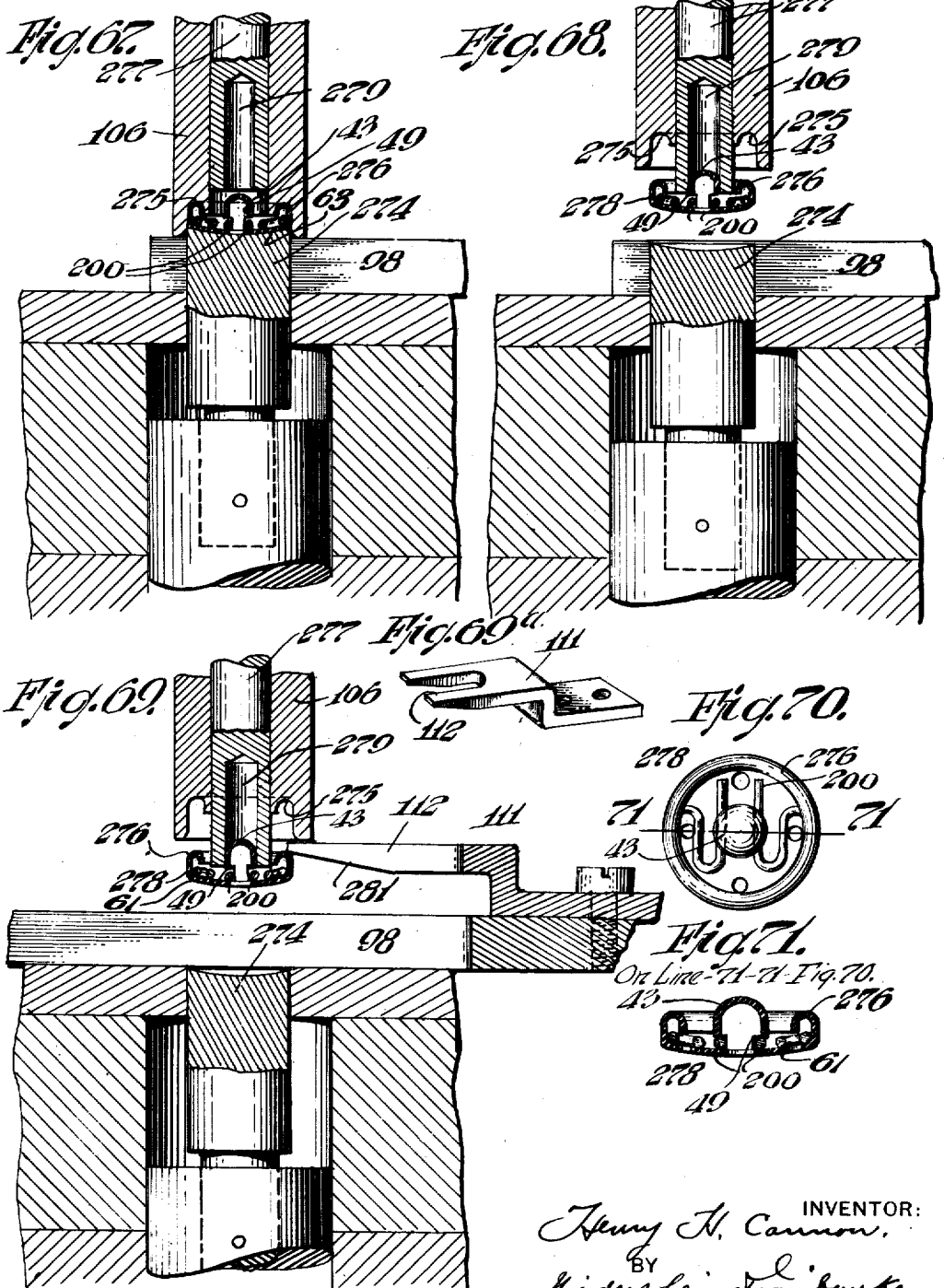

Patented Nov. 21, 1922.

1,436,476

UNITED STATES PATENT OFFICE.

HENRY H. CANNON, OF PHILADELPHIA, PENNSYLVANIA, ASSIGNOR TO REGAL BUTTON WORKS, INCORPORATED, OF PHILADELPHIA, PENNSYLVANIA, A CORPORATION OF NEW YORK.

MACHINE FOR MAKING SNAP FASTENERS.

Application filed April 24, 1922. Serial No. 556,233.

*To all whom it may concern:*

Be it known that I, HENRY H. CANNON, a citizen of the United States, residing in the city and county of Philadelphia, State of Pennsylvania, have invented a new and useful Machine for Making Snap Fasteners, of which the following is a specification.

My invention consists of a novel machine for expeditiously and automatically making the socket member of two-part snap fasteners, said socket members usually consisting of a sheet metal disk having its central portion pressed out to form a socket or female member, which at its peripheral edge is cupped or flanged and then rolled inwardly to confine a closing socket spring within the cup, said spring having a pair of internal legs passing through lateral slits positioned in the socket or female member in such manner that they closely embrace a ball or male member carried by the counterpart of the socket member to hold the button within the socket.

By my novel machine, I have produced a structure wherein the expense of manufacturing is reduced to a minimum and wherein the number of transferring elements and their extent of movement or travel is also reduced to a minimum, being entirely in rectilinear lines, my invention being capable of producing snap fasteners at the rate of about one hundred and twenty five a minute and having an output and capacity in excess of other machines.

To the above ends, my invention consists of a novel strip feeding mechanism, comprising a rock shaft, which is positively actuated by a novel cam mechanism, having means for quickly adjusting the extent of the oscillation of said rock shaft and the actuating pawl, spring pressed means being provided to cause said pawl to positively engage the strip during the feeding operation.

It further consists of novel actuating means for the drawing and blanking punches, which are positively actuated by a cam and lever mechanism, provision being made for readily effecting the adjustment of the drawing punch by an adjustable bar carried at the top of said lever, said blanking punch being also readily adjustable.

It further consists of a novel construction of right and left-hand shell carriers, whose movements are in a rectilinear line towards the center of the machine, the extent of travel of the formed shell from the blanking and drawing punches being only two and one-half inches in a rectilinear line, whereby the speed and capacity of the machine are greatly increased.

It further consists of a novel cam and slide mechanism for effecting the actuation of said shell carriers at the proper intervals.

It further consists of a novel manner of effecting the formation and transfer of the finished spring to its point of delivery into the formed shell, the finished spring having an extent of travel of only one inch from its point of formation into the formed shell.

It further consists in a novel construction of a vertical moving former, a clamping member coacting with the front thereof, and spring forming jaws, one of said jaws being provided with a bell mouth for the reception of the free end of the spring during the initial operations thereon.

It further consists in a novel manner of forming the legs of the spring by a back former of novel construction, which latter is provided with a plurality of forward movements whereby the finished springs of standard and uniform sizes are produced in a rapid and expeditious manner.

It further consists of novel mechanism for effecting the actuation of the jaws carrying the forming tools and a novel manner of operating the vertical former.

It further consists of a novel manner of effecting the desired adjustments of the opening and closing of the jaws which carry the spring forming tools.

It further consists of a novel manner of transferring the formed shell to a point in vertical alignment with the spring pusher, and a novel manner of actuating the spring pusher and propelling the shell with the spring therein in a right line to a point in alignment with the rolling punch.

It further consists in a novel construction of the spring pusher, which is provided with a shoulder near the bottom thereof to effectively engage the curved portion of the spring during the act of assembling the latter within the formed shell.

It further consists in a novel manner of mounting and actuating the rolling punch, whereby the final rolling operation upon the upper edge of the shell is effected.

It further consists of novel means for initially effecting the descent of the rolling punch upon the top of the formed shell with the assembled spring therein and novel means for completing the rolling operation by the upward movement of the lifter towards said rolling punch.

It further consists of a novel construction of a gate positioned in the center of the machine, said gate serving as a combined support or guide for the drawing and blanking punches, the spring pusher and the rolling punch, said blanking punch and rolling punch being secured in said gate and moving in unison therewith, while the drawing punch and the spring pusher are capable of independent reciprocatory movements within said gate but independent thereof.

It further consists in the novel construction of a gate, a rolling punch fast therein and movable in unison with said gate, and a stationary vertical stripper co-operating with said rolling punch, in conjunction with a laterally movable horizontal forked stripper.

It further consists of other novel features of construction and advantage, all as will be hereinafter fully set forth and pointed out in the claims.

For the purpose of illustrating my invention, I have shown in the accompanying drawings, certain forms thereof which are at present preferred by me, since the same will give in practice satisfactory and reliable results. It is to be understood, however, that the various instrumentalities of which my invention consists may be variously arranged and organized and that my invention is not limited to the precise arrangement and organization of these instrumentalities as herein shown and described.

Figure 2:
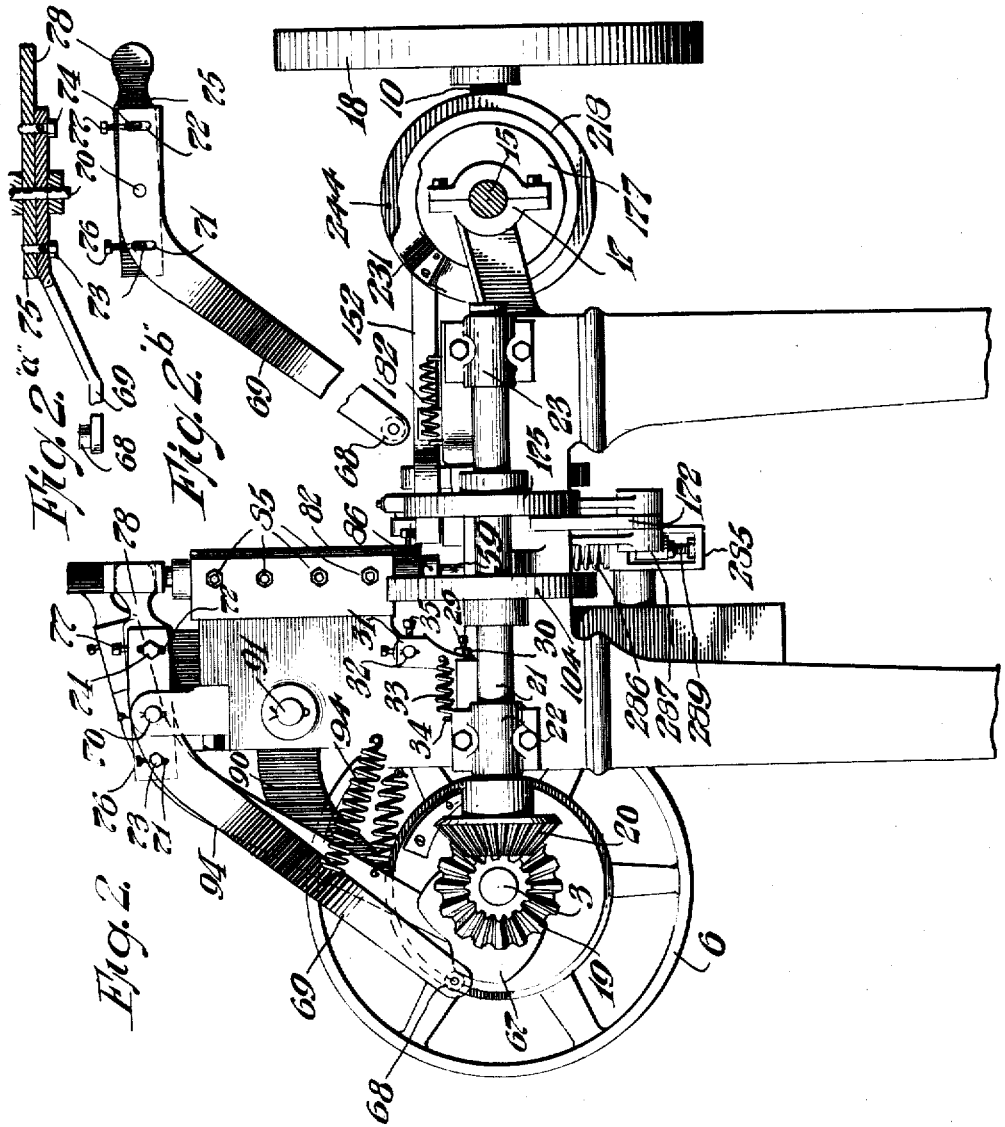
Figure 2 represents a right hand side view of the machine seen in Figure 1.

Figure 2ᵃ represents partly in section, a plan view of one of the levers seen in Figure 2, showing the manner of adjusting the bar on the upper end of said lever, which actuates the plunger of the drawing punch.

Figure 2ᵇ represents a side elevation of Figure 2ᵃ.

Figures 3, 3A:
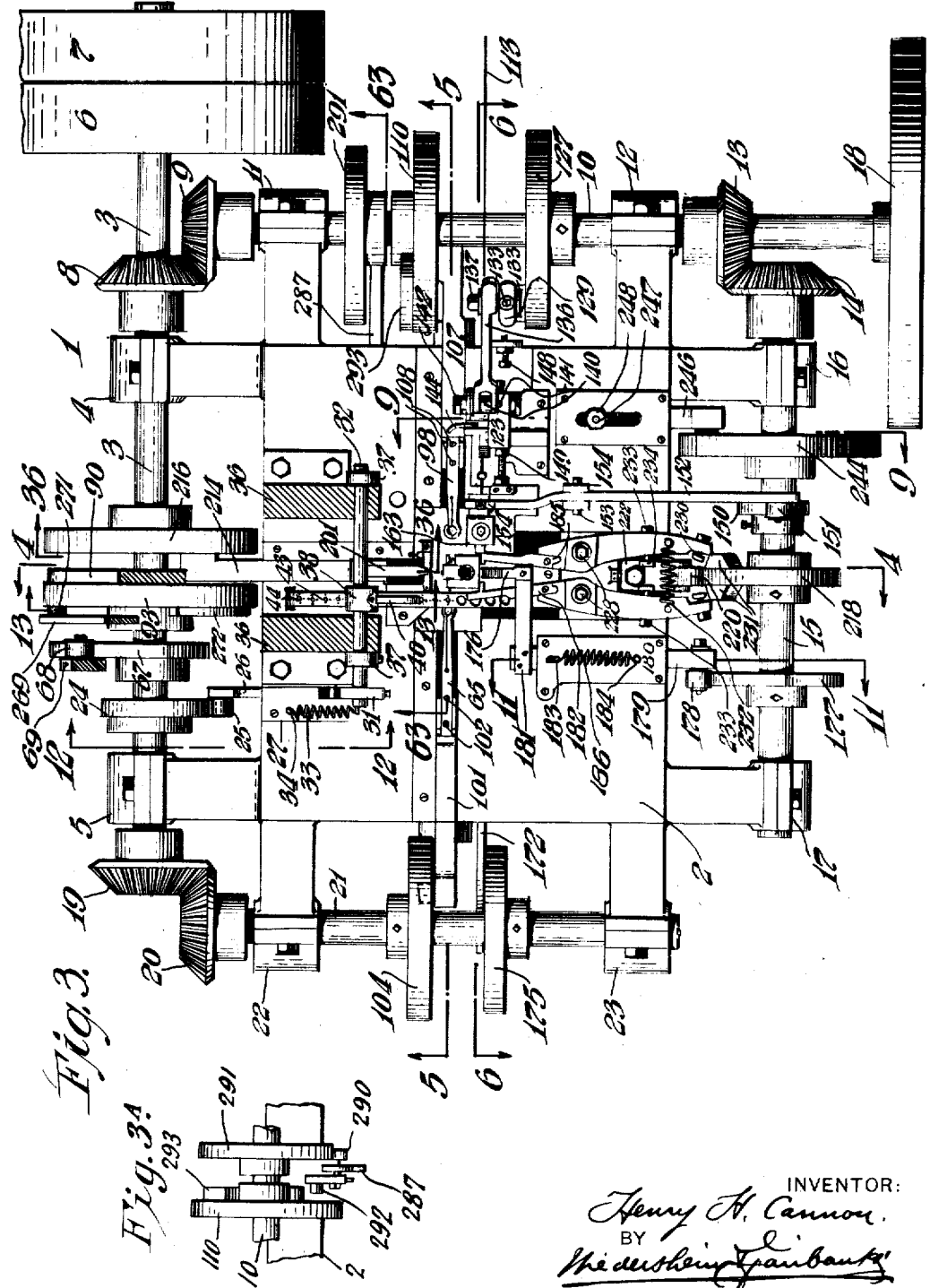

Figure 3 represents a plan view of the machine, certain of the parts being shown in section.

Figure 3ᵃ represents an end view of the right hand side of Figure 3.

Figure 4 represents a vertical section on line 4—4 Figure 3, certain of the parts being shown in elevation.

Figure 5 represents a vertical section on line 5—5 Figure 3, showing particularly the mechanism for actuating the shell carriers, the blanking and drawing punches, the spring pusher, the rolling punch, strippers and lifter.

Figure 5ᵃ represents a side elevation of the upper portion of Fig. 5.

Figure 6 represents a section on line 6—6 Figure 3, showing the wire feeding and clamping mechanism and the former actuating mechanism.

Figure 7 represents on an enlarged scale a portion of the mechanism seen at the left of Figure 6.

Figure 7ᵃ represents a section on line 7ᵃ—7ᵃ Figure 7.

Figure 8 represents a section on line 8—8 Figure 7.

Figure 8ᵃ represents a perspective view of the throw out for the wire and its support seen in Figures 7 and 8.

Figure 9 represents a section on line 9—9 Figure 3, showing the mechanism for operating the spring carrier.

Figure 9ᵃ represents on an enlarged scale, the mechanism for effecting the intermittent clamping of the wire.

Figure 10 represents a perspective view in detached position of the spring carrier and its adjuncts.

Figure 11 represents a section on line 11—11 Figure 3, showing the actuating mechanism for the wire clamping device coacting with the former.

Figure 12 represents on an enlarged scale a section on line 12—12 of Figure 3, showing the mechanism for actuating the rock shaft carrying the strip feeding pawl.

Figure 13 represents on an enlarged scale a section on line 13—13 of Figure 3, showing the strip feeding mechanism.

Figure 14 represents on an enlarged scale a section on line 14—14 of Figure 13, showing the guide and die block for the strip.

Figure 15 represents a perspective view showing the pawl for feeding the metal strip, the relative positions of the drawing and blanking punches thereto, the drawing and blanking die, and the position of the shell carrier for receiving the finished shell.

Figure 16 represents on an enlarged scale a plan view of the strip seen in Figure 15.

Figure 17 represents a side elevation of Figure 16.

Figure 18 represents a sectional view, showing the relative position of the blanking punch and drawing punch and their adjuncts at the first step of the operation of making the cupped shell.

Figure 19 represents a sectional view similar to Figure 18, but showing the position the blanking punch and the drawing punch and their adjuncts assume during the second step of the operation of making the cupped shell.

Figure 20 represents a sectional view showing the position the blanking punch and the drawing punch and their adjuncts assume during the third step of the operation of making the cupped shell.

Figure 21 represents a sectional view showing the position of the blanking punch and drawing punch and their adjuncts during the fourth step of the operation of making the cupped shell.

Figure 22 represents a sectional view showing the position the blanking punch and drawing punch and their adjuncts assume during the operation of transferring the finished shell into the left-hand shell carrier.

Figure 22ᵃ represents a plan view of the finished shell seen in Figure 22.

Figure 23 represents a side elevation of Figure 22ᵃ.

Figure 24 represents a plan view, showing the position of the spring forming devices in the first step of feeding the wire from which the spring is made.

Figure 24ᵃ represents on an enlarged scale a perspective view of the former seen in Figure 24.

Figure 25 represents a plan view of certain of the parts seen in Figure 24, showing the clamping member moved against the former.

Figure 25ᵃ represents a plan view of the straight wire from which the spring is made, after being cut to the requisite length.

Figure 26 represents a plan view showing the next or second position the parts seen in Figure 25 assume in the formation of the U-shaped portion of the spring.

Figure 26ᵃ represents on an enlarged scale a perspective view of the bell mouth on the front of the left-hand forming tool.

Figure 27 represents a plan view of the U-shaped spring formed by the mechanism seen in Figure 26.

Figure 28 represents a plan view of the spring forming elements showing the third step in the formation of a spring.

Figure 29 represents a plan view of the spring after the operation seen in Figure 28.

Figure 30 represents a plan view showing the last step in the formation of the finished spring.

Figure 31 represents a plan view of the finished spring.

Figure 32 represents on an enlarged scale a plan view of the elements seen in Figure 30 whereby the finished spring is formed.

Figure 33 represents a front view, partly in section, of Figure 32, showing the former in its lowest position and the finished spring stripped therefrom and retained in the spring carrier.

Figure 34 represents a plan view of one form of a former, which may be employed.

Figure 35 represents a plan view of the former seen in Figure 32.

Figure 36 represents a section on line 36—36 of Figure 3, showing the actuating mechanism for the rear former.

Figure 37 represents a perspective view of the rear former employed in the final operation of completing the spring.

Figure 38 represents a section on line 38—38 of Figure 37, showing the movable tongue and its adjuncts.

Figure 39 represents a perspective view of the tongue and its adjuncts employed in Figures 37 and 38.

Figure 40 represents a perspective view of another type of rear former.

Figure 41 represents a section on line 41—41, Figure 40.

Figure 42 represents a front end view of Figure 40.

Figure 43 represents a perspective view of another construction of rear former.

Figure 44 represents a longitudinal section on line 44—44 of Figure 43.

Figure 45 represents a transverse section on line 45—45 of Figure 43.

Figure 46 represents a section on line 46—46 of Figure 28, showing the manner of mounting and supporting the jaws of the forming tools and the slide which actuates the spring carrier.

Figure 47 represents a section on line 47—47 of Figure 30, showing the stops and stop screws for the jaws.

Figure 48 represents a plan view with the jaws removed showing a completed spring in alignment with the shell carriers and the means for imparting a slight tension upon the spring legs.

Figure 49 represents on an enlarged scale a plan view of the spring carrier seen in Figure 48.

Figure 50 represents a transverse section on line 50—50 of Figure 49.

Figure 51 represents a transverse section on line 51—51 of Figure 49.

Figure 52 represents a perspective view of certain of the parts seen in Figure 48 in detached position.

Figure 53 represents a section on line 53—53 of Figure 52.

Figure 54 represents a perspective view showing the right and left-hand shell carriers in central position and with their jaws in vertical alignment.

Figure 55 represents on an enlarged scale a sectional view of the spring pusher in vertical alignment with the spring carrier and the shell carriers, prior to the assembling of the spring into the shell.

Figure 56 represents a sectional view similar to Figure 55, but showing the second position the parts assume in the operation of pushing the spring into the shell.

Figure 57 represents a sectional view similar to Figure 56, showing the third and last position the parts assume in the assembling operation.

Figure 58 represents a sectional view similar to Figures 56 and 57, but showing the position the parts assume in transferring the assembled spring and shell from the upper or left-hand shell carrier into the lower or right-hand shell carrier.

Figure 59 represents a side elevation of the lower portion of the spring pusher seen in Figures 55 to 58.

Figure 60 presents a bottom plan view of Figure 59.

Figure 61 represents a plan view of the shell and spring in assembled position.

Figure 62 represents a section on line 62—62 Figure 61.

Figure 63 represents on an enlarged scale a section on line 63—63 of Figure 3, showing also a portion of the elements at the right of Figure 5.

Figures 64 and 65 represent views of the left and right-hand shell carriers, in detached position.

Figure 66 represents a sectional view of the rolling punch, its vertical stationary stripper, the right-hand shell carrier and the lifter in its lowest position.

Figure 67 represents on an enlarged scale a view similar to Figure 66, but showing the position the parts assume in the first operation of rolling the edge of the shell inwardly.

Figure 68 represents a sectional view showing the elements in Figure 67, but showing the rolling of the shell completed and the stripper in the act of stripping the shell from the rolling punch.

Figure 69 represents a sectonal view similar to Figure 68, showing the position the parts assume at the commencement of the final stripping operation.

Figure 69ª represents a perspective view of the final stripper seen in Figures 5 and 69.

Figure 70 represents a plan view of the completed socket or female member of the button.

Figure 71 represents a section on line 71—71 of Figure 70.

Figure 72 represents a sectional view of the adjustable pinch cam seen in Figure 9ª.

Figure 73 represents an end view of Figure 72, the shaft being in section.

Similar numerals of reference indicate corresponding parts.

Referring to the drawings:—

1 designates my novel snap fastener machine, the same comprising the frame or bed 2, in which is supported at the back thereof the main shaft 3 in the bearings 4 and 5. The main shaft carries the tight and loose pulleys 6 and 7, whereby power is applied thereto, and it also carries near its right hand end the bevel gear 8, which meshes with the bevel gear 9, which is mounted on the right hand shaft 10, which rotates in the bearings 11 and 12, the front of said right-hand shaft carrying the bevel gear 13, which meshes with the bevel gear 14 mounted on the front shaft 15, which rotates in the bearings 16 and 17, the front of said right-hand shaft carrying the hand wheel 18, which is used when it is desired manually to adjust or to set any portion of the mechanism.

19 designates a bevel gear mounted on the left of the main shaft 3, which is in mesh with the bevel gear 20 mounted on the left-hand shaft 21, which is mounted in the bearings 22 and 23.

*The strip feeding mechanism.*

Near the left-hand end of the shaft 3 (see Figure 3) is mounted the outside cam 24, which operates the roller 25, which is carried on the slide 26, which is guided in the ways formed between the bed 2 and the casting 27, see Figure 12. The inner end of the slide 26 carries the lug 28, against which contacts the end of the screw 29, having the lock nut 30 thereon, which screw passes through the lower end of the rock arm 31, which is mounted on the rock shaft 32, said rock arm being held in the proper position by the spring 33, one end of which latter is attached thereto and its other end secured to any fixed point as the pin 34.

The rock arm 31 is held fast on the rock shaft 32 by the set screw 35, and said rock shaft has its bearings in the upright portions 36 of the frame-work (see Figure 3) and is held in position therein by the collars 37 secured to the outer ends thereof.

38 designates a rock arm mounted on said shaft 32 and secured fast thereon by the set screw 39.

40 designates a pawl having one end pivoted at 41 in the lower portion of the rock arm 38, while its outer or free end 42 engages with the teats 43 on the metal strip 44 for the purpose of feeding the latter, as will be hereinafter explained.

The pawl 40 is pressed downwardly by the pin 45, which has the head 46, against which bears the lower end of the spring 47, the upper end of said spring bearing on the screw 48 (see Figure 13).

The construction of the metal strip 44 will be best understood from Figures 13, 15, 16 and 17, it being understood that the said strip is initially a flat blank of suitable thin metal or material, which is operated upon in a separate machine, so as to produce the structure seen in Figures 16 and 17, wherein the teats 43 are formed, which are in the form of rounded, semi-spherical or ball structures having the side cuts 49 therein and around each ball or teat are positioned the four holes 50, as will be understood from Figure 16, the teats being spaced equally apart, as is evident.

The manner of supporting and guiding the strip thus formed will be understood from Figures 13, 14 and 15, said strip passing initially through the slot 51 and thence up through the hole 52 along over the die block 53 and under the stripper 54, the top of said stripper being cut out as indicated at 55, see Figure 15, so as to afford room for the pawl 40 to function. The bottom of the stripper has a guiding recess 56 formed therein, which is of substantially the same width as the metal strip 44, so that the latter is properly positioned and guided as it is advanced during each reciprocation of the pawl 40.

It will be apparent that during each forward movement of the pawl 40, the strip 44 is advanced a certain distance, and it is held temporarily stationary in position by means of said pawl 40 and the parts may be assumed to be now in the position seen in Figure 18.

*The operation of the blanking and drawing punches.*

In Figure 18, I have shown the inner or drawing punch 57 as being about to descend, said punch being provided with the hole 58, which is in vertical alignment with a teat 43 of the strip 44.

In the first step of the operation, the drawing punch 57 descends until it contacts with the top of the strip 44, the teat 43 being now centered in the hole 58. The drawing punch 57 being now in contact with the top of the strip 44, the outer or blanking punch 59 descends, the parts now appearing as seen in Figure 19.

Upon the descent of the blanking punch 59 into the position seen in Figure 20, a flat circular disk as indicated at 60 is formed as the third step in the operation, and the drawing punch 57 has now descended into the position seen in Figure 20. The positions the blanking punch 59 assumes after the formation of the flat disk 60 will be understood from Figures 20, 21 and 22.

In the fourth step of the operation, the drawing punch 57 descends further into the position seen in Figure 21, in which position the flat disk 60 is given a slight concavity as indicated at 61 and the outer annular wall or flange 62 is formed.

The cup or shell of the button is now formed as indicated at 63. The further downward movement or descent of the drawing punch 57 forces the cup or shell 63 into the position seen in Figure 22, wherein said shell is shown as having been carried into the jaws 64 of the left-hand shell carrier 65, the latter being cut longitudinally as indicated at 66, see Figure 64, so as to give sufficient resiliency to said jaws 64, so that they will expand sufficiently to receive and frictionally engage the shell 63. The punches 57 and 59 now move upwardly from the position seen in Figure 22 into the position seen in Figure 18, and the shell remains in the left-hand carrier 65.

It will be understood that when the blanking punch 59 has functioned to cut the flat disk 60, as seen in Figure 20, the pawl 42 moves backwardly a space equal to the distance between a pair of the teats 43 in readiness to engage the contiguous teat to advance the strip 44 forwardly again.

While the operation of the punches 57 and 59 can be effected by any suitable mechanism, provided the movements of said punches are properly timed, as above described, I have shown herein the preferred form of mechanism for effecting the proper movements of said punches, which is best shown in Figures 2 and 4.

The outside cam 67, see Figure 3, is mounted on the main shaft 3, the contour of said cam being understood from Figure 2, and said cam operating a roller 68 contacting with its working face, said roller being mounted on the lower end of the lever 69, see Figures 2 and 4, said lever being fulcrumed at the point 70, as will be understood from Figure 2.

It will be apparent that the extent of movement of the drawing punch 57 and the blanking punch 59 has to be determined with considerable accuracy in view of the character of the material which is operated upon, and to this end, I provide a convenient adjusting means for the upper end of the lever 69 whereby the extent of travel of said drawing punch can be readily adjusted, as seen in Figures 2ª and 2ᵇ.

The upper end of the lever 69 is provided on each side of its fulcrum 70 with two elongated slots 71 and 72, through which pass the bolts 73 and 74, said bolts engaging the bar 75, it being apparent that the fulcrum 70 passes through both the upper end of the lever 69 and said bar 75. Consequently, by loosening the bolts 73 and 74, the bar 75 can be rocked upon the fulcrum 70 and when the desired point of adjustment has been reached, the bolts 73 and 74 are tightened and the top adjusting screws 76 and 77 are also tightened.

Figure 1:
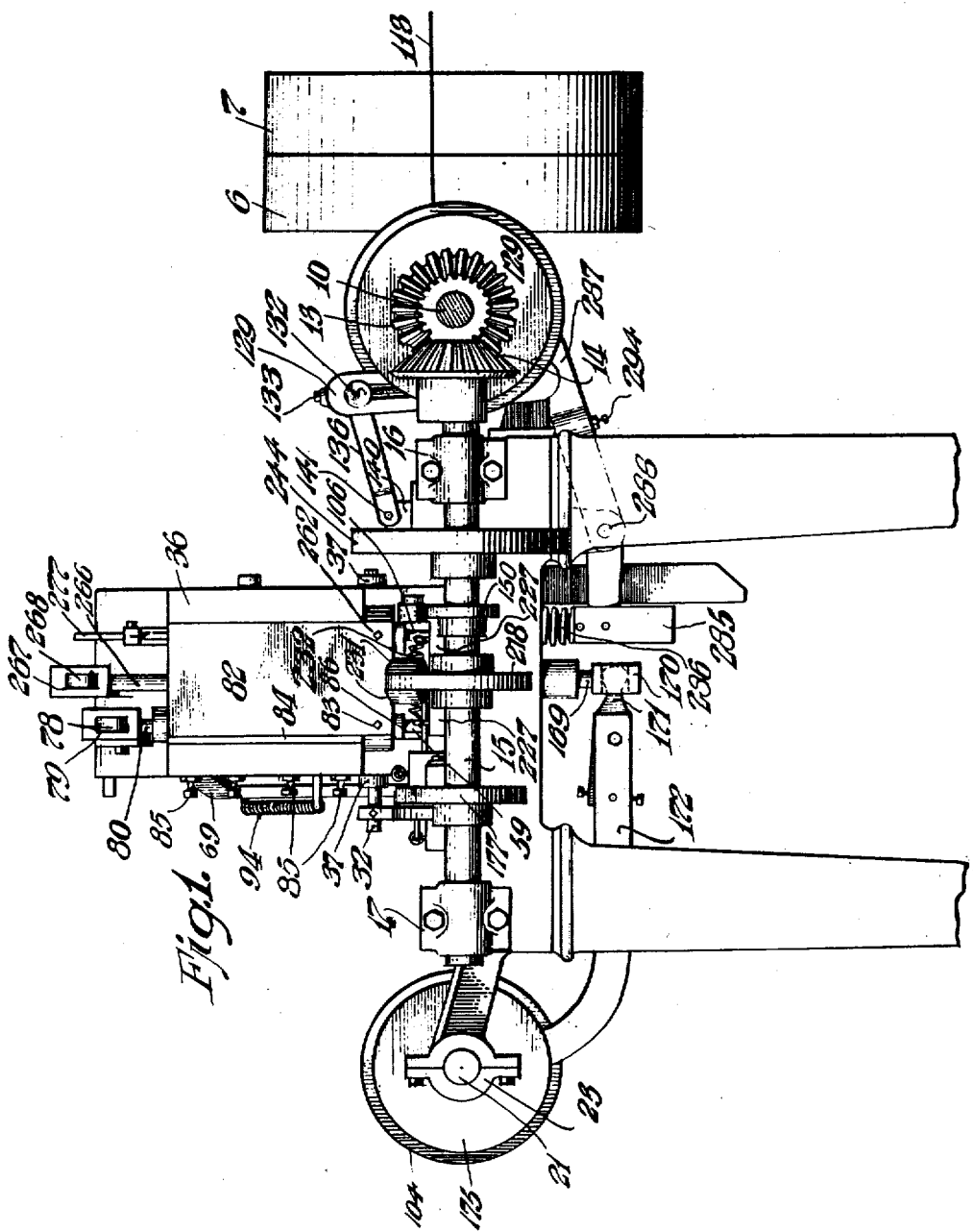
Figure 1 represents a front elevation of a snap fastening machine, embodying my invention.

The forward end 78 of the bar 75 preferably projects a short distance beyond the upper end of the lever, as will be understood from Figures 2ª and 2ᵇ and engages the squared recess or seat 79 in the upper end or head of the plunger 80, as understood from Figures 1 and 5. The plunger 80 at its lower end as seen in Figure 5, is provided with a hole or seat, in which is received the upper end of the drawing punch 57 seen in Figures 15, 18, 19, 20, 21 and 22, the upper end of said drawing punch being secured in position in said plunger by means of a transverse pin 81.

Referring to Fig. 5, it will be understood that the plunger 80 has a free up and down vertical or reciprocating movement in the gate 82, and consequently the drawing punch 57 has a free up and down movement with respect to the gate 82 and independently thereof.

The blanking punch 59, however, as will be understood from Figure 5, is fixed with respect to the gate 82 and moves up and down in unison or as a unit with said gate, the fixed position of said blanking punch 59 with respect to the gate being assured by means of the set screw 83, (see Fig. 1).

The gate.

The gate 82, as will be understood from Figure 1, slides vertically in suitable ways formed in the frame or uprights 36, and any lost motion is taken up by the gib 84, which is adjusted by means of the set screws 85 and their lock nuts, which I have shown in Figures 1, 2 and 5 as being four in number, although this number can of course be changed, if desired. The proper position of the blanking punch 59 with respect to the gate 82 is further assured by means of the lock nut 86, which is tightened against the bottom of the gate.

The gate 82 carries also the spring pusher 105 and the rolling punch 106, as will be understood from Figures 5 and 63, and which will hereafter be referred to in their proper sequence. The gate 82 has on its back the lugs 87 between which the seat 88 is formed, whose walls are engaged by the upper end 89 of the lever 90, which is fulcrumed at 91, the opposite or lower end of said lever being provided with a roller 92, which engages the inside cam 93, which is mounted on the main shaft 3, as will be understood from Figures 3 and 4, so that it will be seen that as the main shaft 3 rotates at the proper intervals, the end 89 of the lever 90 will oscillate and impart a reciprocatory motion to the gate 82 and its adjuncts. The spring 94 seen in Figs. 1, 2 and 5 has one end connected to the housing and its other end connected to the lever 69, whereby the proper position of the latter with respect to the working face of its cam is always assured.

The gate 82 in my machine has an important function since it serves as the operating means for the blanking punch 59 and the rolling punch 106, and it further serves to position and guide the drawing punch 57 and its plunger 80 as well as the spring pusher 105 and its plunger 266. By positioning and collocating the gate 82 and the punches 57, 59 and 106 and the spring pusher 105 in the center of the machine, in the manner described, I am enabled to reduce the extent of travel of the shell 63 from its point of formation to its point of completion with its assembled spring, to a distance of two and one-half inches, and in addition, I transfer said shell in a rectilinear line only, which in practice effects a great saving in time and the capacity of the machine.

The shell carriers.

I have heretofore, as will be understood from Figure 22, described the formation and the transferral of the shell 63 into the left-hand shell carrier 65 seen in Figure 22, said left-hand shell carrier 65 being also shown in Figures 5, 15, 18 to 22 and in Figures 48, 54, 55, 56 to 58, 63, 64.

It will be understood that there are two of these shell carriers 65 and 98, it being understood that the left-hand carrier 65 is constructed as best seen in Figure 64, and has the front ends of the jaws 64 cut away as indicated at 95 in Figs. 64 and 54. The object of this construction is to enable a slight but sufficient pressure to be given to the shell 63 when it is gripped in the jaws 64, and when said jaws move to the right against the concavity 96 of the bridge 97 (seen in Fig. 54), it will be seen that by the resiliency of said jaws and by the slight but requisite pressure of the shell 63 against the concavity 96, said shell will be frictionally gripped with sufficient firmness during the positioning of the spring within the shell, as will be hereinafter explained.

It will be understood that said shell after the spring has been positioned therein is transferred to the right-hand or bottom shell carrier 98, which is provided with the resilient portions 99, which terminate in the closed jaws 100, as will be understood from Fig. 65, it being understood that the right-hand carrier 98 and the left-hand carrier 65, as will be seen from Figs. 64 and 65, are substantially identical, except that the jaws 64 of the left-hand carrier 65 are cut away at the points 95 for the purposes explained and as will be understood from Figure 54.

The right-hand carrier 98 is positioned at the proper intervals, so that its jaws 100 are below and in vertical alignment with the jaws 64 of the left-hand carrier 65.

The shell carrier operating mechanism.

The general relative positions of the left-hand and right-hand shell carriers 65 and 98 will be understood from Figures 3, 5 and 63, it being apparent that when the left-hand carrier 65 is in its extreme left-hand position, it is in vertical alignment with the punches 57 and 59, as will be understood from Figures 5, 15, 18 to 22 and 63.

The left-hand shell carrier 65 is reciprocated to the right of its position in alignment with the punches 59 and 57 by means of the mechanism best seen in Figs. 3 and 5, comprising the dove-tailed slide 101 to which the outer end of the shell carrier is secured by the screws 102, the outer or left-hand end of said slide carrying the roller 103, which engages the inside cam 104 mounted on the left-hand shaft 21.

From the contour of the cam 104, see Fig. 5, it will be apparent that as said cam and the left-hand shaft 21 rotate, the engagement of the roller 103 with said cam will cause the left-hand shell carrier to move from the position seen in Fig. 5 to the right when viewed in the front of the machine, so that the shell 63, seen in Fig. 22, when the punches 57 and 59 rise, will be advanced into the position seen in dotted lines in said Figure 22, in which position the jaws of the shell carrier and the shell 63 therein are in vertical alignment with the spring pusher 105, as will be understood from Figs. 55 to 58.

Standing at the front of the machine, it will be understood that when the right-hand shell carrier 98 is in its extreme right-hand position, it will appear as seen in Figs. 5, and 63, and its jaws 100 will be in vertical alignment with the rolling punch 106 seen in said Figures 5 and 63, it being understood that both the shell carriers 65 and 98 have a horizontal rectilinear movement and that the carrier 98 is below the carrier 65, so as to enable the spring pusher 105 at the proper intervals after the spring has been positioned in the shell, to force said shell into the jaws 100 of the right-hand shell carrier, the relative position of the left-hand carrier 65 and the right-hand carrier 98 during the positioning of the springs in the shells being understood from Figures 55 to 58 inclusive.

The right-hand shell carrier 98 is secured to the dove-tailed slide 107 by means of the screws 108 and the outer end of said slide carries the roller 109, which engages the inside cam 110, which is mounted on the right-hand shaft 10.

The screws 108 above referred to also secure in position the horizontally moving final forked stripper 111 seen in Figs. 5, 69 and 69ª, said stripper comprising a body portion having the bifurcation or fork 112 in its forward portion, best seen in Fig. 69ª.

I desire to call especial attention to the fact that both my shell carriers in practice have a movement of only one and one-quarter inches in a rectilinear line, which is a great advantage over prior machines, whereas in the shell carrier is a dial moving in a curvilinear path.

The wire feed.

It is desirable in machines of this character for the wire from which the spring is formed to be intermittently fed forwardly, then temporarily gripped or retained in stationary position, while a predetermined length of the wire is cut or sheared off and then for means to be provided for retracting the wire feeding mechanism.

It is obvious that this can be effected by various devices, but in my present machine, I preferably employ the construction seen in Figs. 3, 6, 7 and 8.

It will be understood that the sectional views seen in Figs. 6 and 7 are viewed from the rear of the machine, and that the wire 113 shown at the right of Fig. 3 is fed from right to left, whereas in Figs. 6 and 7, the wire 113 appears as being fed from left to right, and first passes through the guide 114 and thence passes over the top of the plate 115 and thence under the presser foot 116, which is fulcrumed on the pin 117.

It will be apparent that the fulcrum 117 of the presser foot is eccentric to its jaw or clamping portion 118, so that as said presser foot is rocked on its fulcrum, the jaw portion 118 thereof moves towards or away from the plate 115, thereby clamping the wire 113 intermittently at the desired predetermined intervals.

The wire feed is composed of the slide 119, which is secured to the bed 2 of the machine by the screw 121, and on said slide reciprocates the carrier 122, which is composed of the base portion 123 and the upright portion 124. The slide is provided with the gib 125 and one or more set screws 126 for the purpose of taking up wear and lost motion.

The wire feed seen in Figs. 6, 7 and 8 is operated from the inside cam 127 mounted on the right-hand shaft 10 seen at the right of Figure 3 and at the left of Figures 6 and 7. The working faces of the cam 127 engage the roller 128, which is mounted on about the middle portion of the lever 129, which has its lower end fulcrumed at the point 130.

The upper end of the lever 129 is provided with a slot 131, in which is mounted the stud 132, which has oppositely flattened sides fitting the elongated walls of said slot 131 as seen in Fig. 7ª.

133 designates a screw, which is threaded into the top of the lever 129 and passes through the body of said stud, as will be understood from Figure 7ª, so that as said screw 133 is rotated, the stud 132 will be adjusted.

The stud 132 has the extension 134, which passes through the bushing 135, which is inserted in the connecting link 136 and the parts are tightened up by means of the nut 1**

137, the washers 138 being interposed between the nut and bushing, so that when the nut 137 is tightened, the bushing 135 will be drawn up against the lever 129, it being apparent that the connecting link 136 works freely on the bushing 135.

140 designates a cam or locking device, which is pivotally connected with the connecting link 136, at the point 141, said cam being loosely mounted upon the pin 142.

Upon the rear wall 143 of the presser foot 116, I mount the throw-off 144, which is pivotally supported at the point 145 and has the upper deflected end 146.

When the throw-off 144 is in the position seen in Figs. 6, 7 and 8, it will be apparent that when the cam 140 is rocked or brought into the position seen in dotted lines in Figure 7, that the portion 147 of said cam 140 will contact with the throw-off 144, as indicated in dotted lines in Figure 7, thereby tilting the presser foot so that its jaw portion 118 will clamp the wire 113 upon the plate 115. When the parts are in the position seen in full lines in Figs. 6 and 7, it will be apparent that the wire 113 is loose or unclamped between the parts 118 and 115.

When, however, the parts assume the position seen in dotted lines in Figure 7, the portion 118 of the presser foot 116 will clamp the wire 113 and as the presser foot 116 and the cam 140 and its adjuncts move from the position seen in dotted lines in Figure 7 to the position seen in full lines in said figure, it will be apparent that the wire will be advanced to the right to this extent.

When the throw-off 144 is turned on its pivot 145, so as to be out of the path of the cam face 147, it will be apparent that no feeding of the wire takes place, it being apparent that when the throw-off is turned on its pivot to the desired extent, it is out of the path of the cam face 147, so that no rocking of the presser foot can take place. The object of the throw off is to provide a manually operated device for instantly stopping the feeding of the wire.

The extent of movement of the wire feed 122 and its adjuncts is determined by the adjustable stops or abutments 148 and 149, which are preferably set screws threaded in suitable supports to effect convenient adjustment and provided with lock nuts, as will be understood from Figures 3 and 7.

The wire clamping mechanism.

It will be obvious that it is essential after the wire has been intermittently propelled forwardly, that some means be provided for temporarily gripping or clamping it during the return movement of the feeding mechanism.

While this can be accomplished in various ways, I preferably employ the mechanism seen in Figs. 3, 7, 9 and 9ª.

Referring to the bottom of Fig. 3 and the upper left-hand portion of Fig. 9ª, the front shaft 15 has mounted thereon the outside pinch cam 150, which actuates the roller 151 mounted on the front end of the lever 152, which is fulcrumed at 153 in the bracket 154. The inner end of the lever 152 is provided with the adjusting screw 154$^x$, whose lower end bears upon the upper movable clamping member 155, which is movable up and down with respect to the lower stationary clamping member 156. The juxtaposed inner faces of the clamping members 155 and 156 are provided with the shallow grooves 157 and 158, through which the wire 113 passes and in which it is temporarily gripped, said grooves being of sufficient depth so that the wire will not be injured during the temporary clamping operation.

The clamping members 155 and 156 are provided with vertically aligning upper and lower pockets 159 and 160 respectively, in which are contained coiled springs 161, said clamping members having the screws 162 passing through them, there being four of said aligning pockets 159 and 160 and four of said screws 162 and four springs 161, the function of said springs being normally to tend to keep the clamping members 155 and 156 apart, but as the shaft 15 and the pinch cam 150 rotate, it will be apparent that at the proper intervals, the adjusting screw 154$^x$ will be depressed so as to depress the upper clamping member 155 upon the lower clamping member 156 and thereby temporarily lock the wire while it is being cut off, as will be hereinafter described. The working faces of the pinch cam 150 are made capable of adjustment, as seen in Figs. 9ª, 72 and 73, so that the machine can be adapted to different lengths of wire feed.

The position of the quill block 163 with respect to the clamping members 155 and 156 will be understood from Figs. 6, 7 and 9ª, and within said quill block is secured the quill 164, by means of the set screw 165, the quill being provided with a passage therein 166 of considerably greater diameter than the wire, and with the outlet passage 167 which is very slightly larger than the area of the wire, as will be understood from Figure 7.

Means for clamping the wire against the vertical former before cutting.

In the operation of forming the spring, it is both necessary and desirable for the wire after having been fed and clamped as above described and as best seen in Figure 9ª to be temporarily clamped against the vertical former not only before it is cut but during the entire period of the formation of the spring, which operation will now be described, reference being had to the right hand portion of Figure 7, Figure 24 and Figures 24ª, and 32.

The construction of the upper end of the former 168 will be best understood from Figure 24ª, wherein it will be seen that the front portion of said former presented to the wire is convex, said former 168 forming the upper terminal of the plunger 169, whose lower end is provided with the seat or recess 170, whose walls are engaged by the end 171 of the lever 172, which is fulcrumed at the point 173 and has at its outer end the roller 174, which engages the inside cam 175, which is mounted on the left-hand shaft 21, (see Figure 6).

It will be seen that as the shaft 21 and the cam 175 rotate, a rocking motion will be imparted to the lever 172, whereby an up and down movement will be imparted to the plunger 169 and to the convex former 168 at its upper extremity.

It is essential that the former 168 be moved to a point above the path of the wire 113 or into the position seen at the right of Figure 7 prior to the clamping and cutting operation.

In Figure 24, the former 168 may be assumed now to be positioned above the wire 113, and the wire is now positioned to be clamped between the front convex face of the former 168 and the movable clamping member 176 seen in Figure 24, and at the right of Figure 7. The clamping member 176 is operated through the medium of the outside cam 177 mounted on the front shaft 15, see Figures 3 and 11, and against the working face of said cam 177 contacts the roller 178, which is carried by the slide 179, which moves in ways formed between the bed of the machine and the top plate 180. The slide 179 has secured to its inner end one end of the arm 181, see Figures 3 and 11, and the right of Figure 7, the opposite end of said arm 181 having secured thereto the clamping member 176, seen in Figures 3, 24, 25, 26, 28, 30 and 32.

182 designates a spring having one end secured to the pin 183, which is secured in the slide 179, the opposite end of said spring being secured to a suitable fixed point, as the pin 184 secured to the top of the plate 180, as will be understood from Figure 11, wherefrom it will be seen that the roller 178 is kept at all times in proper contact with the working face of the outside cam 177.

In Figure 24, I have shown the wire 113, as positioned against the front convex face of the former 168 and the clamping member 176 is about to be moved towards said wire.

In Figure 25, I have shown the next position the parts assume, in the next step of the operation, the clamping member 176 having moved forwardly or inwardly, so that the wire is properly clamped thereby against the front convex face of the former 168.

*The cutting of the wire and forming of the spring.*

In Figures 24, 25, 26, 28, 30 and 32, I have shown the preferred form of jaws and forming tools, whose construction and operation will now be described.

The forming tools are indicated at 185 and 186 and the forming tool 185 is provided at its front outer or right hand end at the point 187 with a shearing or cutting edge, which is adapted to travel in close proximity to the end of the quill 164, so as to shear the wire 113 when the tools 185 and 186 are advanced from the position seen in Figure 25 to the position seen in Figure 26.

The detailed construction of the forming tools 185 and 186 will be best understood from Figures 24, 25, 26, 28, 30 and 32, which will now be referred to.

The forward end of the tool 185 is provided with the rectilinear front edge 188, with which the wire 113 contacts when the parts are in the position seen in Figures 24 and 25. The front inner portion of the tool 185 is provided with an inward extension 189, best seen in Figure 32, which terminates in the jaw 190. The front end of the forming tool 186 is also provided with a rectilinear surface 191, which is in alignment with the surface 188, and there is also provided the forward extension 192, in which the bell-mouthed wire guide 193 is formed, best seen in Figure 26ª, the function of said bell mouthed guide being to permit the left hand end of the wire to be seated in the mouth or recess 193, while the operations shown in Figures 24 and 25 are taking place.

The front end of the tool 186 is provided with an inward extension 194, (see Figure 32) which terminates in the jaw 195, which is positioned in alignment with the jaw 190, so that after the formers 186 and 185 have advanced from the position seen in Figure 25 to the position seen in Figure 26, the straight piece of wire indicated in Figure 25ª as 196, is bent to form the U-shaped member 197 seen in Figures 26 and 27.

The next step of the operation is seen in Figure 28, wherein the jaws 190 and 195 are shown as functioning, being moved towards each other or closed whereby the bent wire 197 seen in Figures 26 and 27 is caused to assume the position seen in Figures 28 and 29, said wire now having the semi-cylindrical contour indicated at 198, which merges into the inwardly deflected portions 199, which latter merge into the two parallel legs 200.

Referring now to the upper portion of Figures 28 and 30, 201 designates the back forming tool, whose construction will be best apparent from the detail views seen in Figures 37, 38 and 39. This back former is provided with a longitudinally extending chamber 202 in which is contained the central tongue member 203, which is composed of the forward flat or tongue portion 204, and the opposite extension 205, which terminates in the stem 206, on which is the collar 207. The position of the tongue member when assembled will be understood from Figures 37 and 38, said tongue member being vertical and held in the proper position by the spring 208, one end of which bears against the collar 207 and the opposite end against the pin 209, wherefrom it will be seen that if the tongue member 204 is pressed inwardly into the body of the back former 201, the tension of the spring 208 will tend to force said tongue forwardly. The position of the tongue 204 when assembled in the back former 201 will be understood from Figures 37, 24, 25, 26, 28, 30 and 32, and it will be seen that on each side of said tongue 204 are provided the short parallel, stationary or rigid tongues 210, which have the outer grooves 298 therein (see Figure 33). The two tongues 210 are preferably integral with the body of the tool 201 and between said shorter side tongues 210 and the central resilient tongue 204, are located the recesses 211, seen at the left of Figure 37, which when the back former is functioning receive the legs 200 of the partly formed spring seen in Figure 29.

The rear end of the tool 201 contains a slot 212, through which the screw 213 passes as best seen in Figures 28, 30 and 36, whereby the back former 201 is secured to the slide 214, which is provided with a roller 215, which engages the inside cam 216 mounted on the rear or main shaft 3, so that it will be apparent that as said main shaft and the cam 216 rotate, the slide 214 and the back former 201 will be reciprocated at the proper intervals.

The position which the back former 201 and its resilient tongue 204 assume during the formation of the legs 200 will be understood from Figure 28. The movements of the various parts are so timed that the back former 201 with its resilient tongue 204 advances into the position seen in Figure 28 just prior to the jaws 190 and 195 closing or being moved into the position seen in Figure 28, whereby the formation of the legs 200 of uniform contour is always positively assured, and when the jaws 190 and 195 open, as seen in Figures 30 and 32, it will be apparent that said legs 200 are temporarily retained in the recesses 211 best seen in Figure 37.

The next step in the operation will be understood from Figures 30 and 32, wherein the jaws 190 and 195 are shown as having been opened. During the period that the jaws 190 and 195 open, it will be understood that the spring is still being clamped by the clamping member 176 against the former 168 as best seen in Figure 32 and the next step in the operation is the additional forward movement of the rear former 201, which, upon the opening of said jaws 190 and 195 travels a slight distance further towards the former 168, whereupon the rigid tongues 210 perform their function of deflecting the portions 199 seen in Figure 29, so that the same assume the re-entrant contour seen in Figures 31 and 32, wherein is shown the finished spring, which I designate as 217.

I desire to call especial attention to the two intermittent forward movements of the back former 201, which I obtain by reason of the dwell $216^{x}$ on the back former cam 216 seen in Figure 36, it being understood that the initial forward movement of the back former 201 moves said former into the position seen in Figure 28, and said back former is momentarily in the position seen in Figure 28, during the period that the jaws 190 and 195 open to the position seen in Figures 30 and 32. While said jaws are open, the extreme throw of the cam 216, as indicated at $215^{x}$ in Figure 36 is functioning to advance the back former into its extreme forward position as seen in Figures 30 and 32. This intermittent forward movement of the back former has an important function in practice, since provision is made thereby for the final step of completing the spring, to be performed while the jaws 190 and 195 are open, so that there is no danger of injury or damage to the spring forming tools, since said jaws are out of the path of the back former during the final spring forming operation.

Still referring to figures 30 and 32, in the next or final step of the spring forming operation, the back former 201 and the clamping member 176 recede from the completed spring 217 and the latter is held by frictional contact upon the upper end of the former 168.

I desire to call special attention to the fact that the clamping member 176 is functioning throughout every step of the spring forming operation to clamp the wire between its forward end and the former 168, and I desire to call further attention to the fact that my back former 201 has a plurality of intermittent movements towards the former 168, the first or initial movement merely positioning the resilient tongue 204 between the legs 200 and the second or final forward movement of said back former causing the tongues 210 to advance into the position seen in Figure 32, as above explained, whereby a better and more uniform construction of spring is produced.

Mechanism for operating and adjusting the forming tools.

It will be apparent that the reciprocation and opening and closing of the forming tools 185 and 186 can be effected by various mechanisms, but I have shown in the present instance, a preferred form of such mechanism, which is best seen in Figures 3, 4, 24, 26, 28 and 30. The cam 218 mounted on the front shaft 15 has the working face 219 against which the roller 220 contacts, said roller being mounted in the ears 221, which are carried in the adjustable block 222 whose construction will be apparent from Figure 4. This block 222 is adjustably mounted upon the slide 223, which is cut out as indicated at 224, thereby forming a space in which the head of the adjusting screw 225 is positioned, said screw being screwed horizontally into the block 222 which is held in the slide 223 by the bolt 226.

By adjusting the bolt 225, the position of the block 222, with respect to the slide 223 can be adjusted, which effects the adjustment of the forming tools 185 and 186 and thereby the extent of their forward movement is determined. The slide 223 has the jaws 227 fulcrumed thereon by the studs 228 and the forward ends of said jaws have the forming tools 186 and 185 secured thereto by any suitable means.

The front ends 229 of the jaws 227 are provided with the adjustable button-head screws 230 which are adapted to contact with the side cams 231 carried on the cam 218, it being apparent that as said cam rotates, the contact of the button-head screws 230 with said side cams will effect the closing of the jaws 190 and 195, when the latter are in their forward position.

The spring 232 which has its ends secured to pins carried by the jaws 227 exerts the proper tension on said jaws and always retains them in proper position relative to the side cams 231.

233 designates a pair of horizontal adjusting screws, which pass through the jaws 227 and their inner ends are adapted to contact with the stops 234, which project upwardly from the block 222. These adjusting screws 233 are in threaded engagement with the jaws, and by the adjustment of these screws and the tightening of the outer lock nuts thereon, the desired opening of the said jaws 190 and 195 can be readily adjusted, according to requirements.

It is very essential in machines of this character, where nice and accurate adjustments are essential for the jaws 190 and 195, to provide means which are readily accessible and easily manipulated for this purpose, which I effect by the provision of the adjusting screws 233 and 230, collocated as shown with respect to the jaws 227.

It will thus be seen that the outer working face of the cam 218 effects the reciprocations of the slide 223 so as to advance the jaws 190 and 195 at the proper intervals, while the side cams 231 effect the opening and closing of said jaws at the proper intervals.

The detailed construction and manner of assembling the dove-tail slide 223 and its adjuncts will be understood from the enlarged views in Figures 46, 47 and 48.

Referring to Figures 4 and 48, it will be seen that the rear end of the slide 223 is provided with the recesses 235 in which the springs 236 are contained, one end of each of said springs bearing against the bottom wall of each pocket or recess 235, while the opposite ends of said springs bear against the wall 237 of the housing of the machine, whereby a backward pressure is always exerted upon the slide 223, so as to hold the roller 220 against the cam 218.

The spring transfer mechanism.

Referring now to Figure 30 and the enlarged view thereof in Figure 32, wherein is shown the finished spring 217, it will be understood from our previous description thereof, that the former 168 was in its extreme upward position, the jaws 190 and 195 had opened and the back former 201 and the clamping member 176 had also opened.

The next step in the operation is the descent of the former 168 into the position seen in Figure 33, in which position the spring 217 has been stripped from the former 168, and has snapped into the recesses 238 of the spring carrier 239, best seen in Figure 33, the top of the former 168 being at this period below the spring 217 and now appearing as seen in Figure 33, it being understood that the parts are so proportioned that the former 168 is permitted to have the requisite movement with respect to the spring and the support for the latter.

The construction of the spring carrier will be understood from Figures 4, 10, 48, 49, 50, 51, 52, and 55, the same comprising a flat plate 239 which is secured to the upright portion 240$^x$ of the dovetail slide 241$^{xx}$, said slide 241$^{xx}$ being positioned below the slide 223 already described as will be understood from Figures 4, 46 and 47.

The spring carrier 239 with the spring 217 therein next moves the spring from a position in alignment with the former 168 (seen in Figure 33 and dotted in Figure 48) to the rear of said former, or towards the center of the machine, a distance of about one inch, until said spring reaches the position seen in Figure 48 in alignment with the jaws of the shell carriers 65 and 98, which latter are now in alignment with the spring pusher 105, as seen in Figure 55.

As the spring carrier 239 advances to position the spring 217 in alignment with the spring pusher 105 and the jaws of the shell carriers 65 and 98, just before it reaches this position, the front end of the slide 240 contacts with the cross piece 241, whereby the slide 240 is slightly pushed inwardly, so that its concave wall 241ˣ imparts a slight tension upon the legs 200 of the spring 217 seen in Figure 48, the object being to give the proper tension to the spring, so as to enable the latter to be readily pushed out of its recess 238 in the spring carrier 239 into the position seen in Figure 56.

The cross piece 241 is mounted loosely at the point 242 and is capable of being adjusted by means of the screw 243 and its adjuncts seen in Figures 52 and 53. The slide 240 is mounted in ways in the spring carrier, as seen in Figure 51, and has a recess 242ˣ, whose end walls are engaged by the pin 243ˣ, which limits the movement of the slide in each direction, said slide having the front pin 244ˣ, which is pressed by the spring 245ˣ which tends to keep said slide pressed in the direction of the cross piece 241.

*Mechanism for actuating the spring carrier.*

Referring now to Figure 9, it will be seen that the inside cam 244 is mounted on the front shaft 15 and against this cam bears the roller 245 mounted on the slide 246. The rear end of the slide 246 has the threaded stem 247 seen in Figures 9 and 10 passing therethrough and carrying the nut 248. The stem 247 projects upwardly from the offset portion 249 carried by the post 250 mounted in the block 251, said parts 250, 249 and 247 constituting an eccentric stud. The block 251 has a slight movement or play in the slot 252 in the offset portion 253 of the lever 254, which is fulcrumed at 255, the opposite end of said lever having the slot 256 therein, which carries the block 257, the pin 258 connecting said block to the dove-tailed slide 241ˣˣ, as will be understood from Figures 4 and 10.

It will be seen from the foregoing that when the nut 248 is loosened, a very slight but accurate adjustment can be given to the eccentric stud and the block 251, whereby the play of the lever 254 and the movement of the spring carrier 239 can be very nicely and accurately adjusted.

It will be seen from the foregoing that the function of the spring carrier 239, as will be understood from Figures 3, 4, 9, 10 and 33 is primarily to receive the finished spring 217 and then to transfer it in a rectilinear line, in practice one inch, directly to a position in alignment with the aligning jaws of the two shell carriers, in which position said spring is also in alignment with the shell contained in the upper or left hand shell carrier 65 and when this position is attained, the parts will appear as seen at the left of Figure 48 and in Figure 55, the spring being now slightly compressed by the slide 240 and in readiness to be pushed into the shell 63, carried by the upper or left hand shell carrier 65 upon the downward movement of the spring pusher 105 from the position seen in Figure 55.

*The assembly of the spring and shell in the upper or left hand shell carrier and the transfer of the assembled spring and shell to the lower or right hand shell carrier.*

Referring now to Figure 55, the spring pusher 105 is shown in its initial elevated position, the openings in the jaws of the two shell carriers 65 and 98 being now in vertical alignment, the spring being in vertical alignment with the shell and the spring pusher 105 being also in vertical alignment therewith. As the spring pusher descends, the parts first assume the position seen in Figure 56. The lower end of the spring pusher 105 is convex and has the hole 259 therein, which is slightly larger than the dome 43 seen in Figure 56 and as the bottom end of the spring pusher is provided with the two curves 261, they engage and slightly spring apart the legs 200 of the spring, so that they appear as seen in Figure 56.

The next step in the operation is seen in Figure 57, wherein the spring pusher 105 has descended a little farther and the legs 200 of the finished spring have now snapped into the parallel side cuts 49 in the bottom of the dome 43, the shell during this operation still remaining in the jaws of the left-hand upper shell carrier 65, as seen in Figure 57. Upon the further descent of the spring pusher 105, the parts appear as seen in Figure 58, and the shell 63 with the assembled spring 217, therein, has now been pushed into the jaws of the lower or right-hand shell carrier 98, the parts now appearing as seen in Figure 58.

In order to facilitate the assembly of the finished spring within the shell, I provide the horizontal shoulder 264 see Figures 59 and 60, which extends about half way around the spring pusher near its lower end and is adapted to contact with the circular portion 265 of the spring 217, see Figure 61, whereby the latter is positively and effectively forced into the shell during the descent of the plunger.

The assembled spring and shell now appear as seen in Figures 58, 61 and 62 and said shell and spring are now contained in the jaws of the lower or right-hand shell carrier 98. The spring pusher 105 now ascends, and its operation will be next referred to.

*The operation of the spring pusher.*

Referring now to Figure 5, the spring pusher 105 is shown as being secured in the bottom of the plunger 266, the upper portion of which is provided with the seat 267, in which the upper end 268 of the lever 269 is mounted, said lever being fulcrumed at the point 270, it being apparent that as said lever is oscillated, the plunger 266 and the spring pusher 105 will rise and fall to the proper extent. The lower end of the lever 269 carries the roller 271, which engages the outside cam 272, mounted on the main shaft 3, see Figures 3 and 13.

It will thus be seen that as the main shaft 3 and the cam 272 thereon rotate, the latter will by reason of its contact with the roller 271 oscillate the lever 269, so that the requisite up and down movement will be imparted to the plunger 266 carrying the spring pusher 105, said plunger being mounted in the gate 82, but moving independently thereof.

I preferably employ two springs 273 best seen in Figure 4, said springs having one of their ends attached to the machine housing and their opposite ends secured to the lever 269.

I employ two springs in order to get the requisite tension upon the lever 269, and as an additional precaution in case one of said springs should break, the other will function, and cause the elevation of the spring pusher out of the path of the back former 201.

*The actuation of the lower or right hand shell carrier and the transferral of the assembled spring and shell from alignment with the spring pusher to alignment with the rolling punch.*

The left-hand or lower shell carrier 98 has now received the shell 63 with the spring 217 assembled therein and the parts appear as seen in Figure 58.

The next step in the operation is to move said right-hand shell carrier 98 with the shell and spring therein to the right of the position seen in Figure 58, so as to bring the edge or upturned flange of the shell 63 into alignment with the rolling punch 106 and when the lower shell carrier 98 arrives at the position seen in Figure 66, the rolling punch 106 is in elevated position and the lifter 274 is also in the position seen in said figure.

*The rolling punch and lifter.*

In the next step in the operation, the rolling punch 106 descends into the position seen in Figure 67 and the lifter 274 next moves from the position seen in Figure 66 to the position seen in Figure 67. By this operation, the shell 63 is moved upwardly out of the shell carrier 98 and the upper edge of the shell is rolled inwardly to conform to the contour 275 of the bottom of the punch 106, the upper edge of the shell being now rolled so as to appear as seen at 276.

The next step in the operation is indicated in Figure 68, wherein the lifter 274 is shown as having descended slightly into the position seen in said Figure 68 and the rolling punch 106 has risen into the position seen in said figure. The stationary vertical stripper 277 now functions as seen in Figure 68 and the completed female or socket member now designated as 278 is pushed out of the rolling punch and is momentarily positioned on the end of said stripper, as seen in Figure 68, the dome or ball 43 of the socket member engaging the bottom of the recess 279 of the stripper. The final stripping is effected by the horizontal, movable stripper 111 which next moves into the position seen in Figure 69, said horizontal stripper being provided with the forked members 112, which straddle the lower end of the vertical stationary stripper 277, and the contact of the bevelled bottom 281 of the horizontal stripper with the rolled edge 276 of the socket member forces the latter downwardly from the vertically movable stripper and the finished socket member now appears as seen in Figures 70 and 71.

It will be understood that the vertical stripper 277 is stationary and is held in its bracket 282 by the set screw 283, the rolling punch 106 is held fast in the gate 82, by the set screw 262 as will be understood from Figure 1, and moves as a unit with said gate. The lifter 274 can be actuated by any suitable means, as will be understood from Figures 5 and 63, wherein I have shown said lifter as positioned at the top of the plunger 284, which moves up and down through the bed of the machine, the bottom of said plunger terminating in the yoke 285. The spring 286 is for the purpose of exerting the proper tension upon the top of the yoke, and within the yoke is positioned the end of the lever 287, which is fulcrumed at the point 288, the end of said lever located in said yoke having the adjusting screw 289 therein, whereby said lever can be adjusted with respect to said yoke to adjust the upward stroke of the lifter, the other end of said lever being provided with a roller 290.

The lifting action of the lever 287 is effected by the roller 290 bearing on the outside cam 291 mounted on the shaft 10, while the descent of the lifter and its plunger 284 is effected by means of the roller 292 engaging a cam 293 seen at the right of Figure 5 in dotted lines and at the right of Figure 3.

The adjusting screw 294 seen in Figure 5 serves as a stop to limit the downward movement of the yoke 285 and its adjuncts against the tension of the spring 286.

In the foregoing description, referring to the back former, I have shown in Figures 35, 36, 37, 38 and 39, one construction of horizontally movable back former and a co-acting vertically movable former 168 which may be employed. In Figures 40, 41, and 42, I have shown another type of back former, which may be employed in lieu of the back former 201 and its adjuncts, wherein 295 designates the modified back former, which is provided with the central tongue 296, and the shorter side tongues 297, which latter are provided on their opposite sides with the aligning grooves or seats 298 of the same character as seen in Figures 33.

The back former 295 is substantially similar to the former 201 already described, except that the central tongue 296 is rigid or integral with respect to the former body, and said formers 201 and 295 are always used with the vertically movable former 168, see Figures 24ª, 32 and 35.

In Figures 43, 44 and 45, I have shown another type of back former 299 which may be employed in conjunction with the vertical former seen in Figure 34, and comprises two body members 300, which are held in assembled position by the transverse screws 301, the front of said members being provided with the tongues 302, which are provided with the internal horizontal seats or recesses as indicated at 303. The rear of the back former 299 is provided with recesses which when the members 300 are assembled form the back elongated slot 304, which has the same function as the slot 212 seen in Figures 37 and 40. The advantage of a former constructed as seen in Figures 43, 44 and 45, is that in case either of the tongues 302 breaks or becomes injured, the same can be readily replaced and it is not necessary to throw away the entire former.

When the back former seen in Figures 43, 44 and 45 is employed, I use the same in conjunction with a vertically moving former whose upper end is formed as indicated at 305 in Figure 34, said former comprising the convex front surface 306, the side members 307 and the central tongue 308, said tongue coacting with the tongues 302 in the formation of the finished spring.

The operation in detail is as follows:—

It will be understood that the strip 44 formed with the dome members 43, the holes 50 and the side cuts 49 seen in Figures 16 and 17 is primarily formed in another machine, and is fed into my novel machine as seen in Figures 3 and 13, and the general operation comprises broadly in sequence, the following steps:— (a) the feeding of the preformed strip of metal 44 and locking it temporarily in position by the pawl 40 so as to position each teat or dome 43 in vertical alignment with the drawing punch 57; (b) causing the drawing punch to descend upon the strip and engage said teat during the operation of the blanking punch 59; (c) causing the blanking punch to descend to shear the blank or disk from the strip; (d) causing the drawing punch to descend to force said disk into the die to form the cup-shaped shell; (e) forcing the formed shell downwardly from the die and propelling it into the left-hand or upper shell carrier, after which the blanking and drawing punches ascend into their normal or initial position; (f) actuating the left-hand or upper shell carrier and the shell therein towards the center of the machine into alignment with the spring pusher, the right-hand or bottom shell carrier being simultaneously advanced into alignment with the spring pusher below said left-hand shell carrier, as seen in Figure 35; (g) the formation and transferral of the finished spring 217 into the position seen in Figure 55 in alignment with the spring pusher and shell; (h) causing the descent of the spring pusher to strip the spring from the spring carrier, force the spring into the shell, and lastly, by a further downward movement to transfer the assembled spring and shell into the lower or right-hand shell carrier, after which the spring pusher ascends or rises to its normal or initial position; (i) moving the lower or right-hand shell carrier with the assembled spring and shell to the right into alignment with the lifter and rolling punch; (j) causing the descent of the rolling punch to the top of the right-hand shell carrier; (k) causing the ascent of the lifter to force the shell upwardly from the right hand shell carrier against the rolling punch to roll the edge of the shell inwardly, thereby clamping the outer curved portion of the spring in position; (l) elevating the rolling punch and leaving the finished socket or female member on the lower end of the vertical stationary stripper; (m) causing the descent of the lifter to a point below the right hand shell carrier, and the actuation of the horizontal final stripper.

In the preceding description and in the following detailed explanation, it will be understood that the terms right and left and front and back are used to define the various elements as they appear when the machine is viewed from the front thereof:—

(a) *The feeding of the preformed strip of metal and locking it temporarily in position by the pawl 40 so as to position each teat 43 in vertical alignment with the drawing punch 57.*

The strip 44 is inserted in the machine, as will be understood from Figures 13, 14 and 15. The actuation of the rock shaft 32 imparts intermittent to and fro motion to the rock arm 38, whereby the pawl 40 by its contact with the teats 43 propels the strip 44 through the guide recess 56 in the stripper 54 so that the teats 43 are accurately positioned below the blanking and drawing punches 59 and 57. The pawl 40 is held always in contact with the strip by means of the spring 47, as will be understood from Figure 13, and the proper actuation of the rock arm 38 is effected by means of the mechanism seen in Figure 12 comprising particularly the slide 26, the roller 25 and its coacting cam and the spring 33.

(b) *Causing the drawing punch to descend upon the strip and engage each teat during the operation of the blanking punch 59.*

The parts are now in the position seen in Figure 18, and in the first step of the shell forming operation, the drawing punch 57 descends into the position seen in Figure 19. The next step of the operation is shown in Figure 20, where the drawing punch and the blanking punch have simultaneously descended and the disk has been sheared or formed by the blanking punch 59. The third step in the operation is shown in Figure 21, wherein the drawing punch 57 has descended further so as to form the cup 63. The shell forming operation is now completed and the next step is the transferral of the shell into the left hand shell carrier, which is shown in Figure 22, where the drawing punch 57 has descended still further and transferred the formed shell 63 into the left-hand shell carrier 65. The manner of operating the drawing punch and the blanking punch will be understood from Figures 2, 4, 5 and 12, wherefrom the operation of the gate 82 which carries the blanking punch 59 will be understood, the independent movements imparted to the drawing punch being effected through the mechanism seen in Figures 2, 4 and 5.

(f) *Actuating the left-hand or upper shell carrier and the shell therein towards the center of the machine in alignment with the spring pusher, the right hand or bottom shell carrier being simultaneously advanced into alignment with the spring pusher below said left hand shell carrier, as seen in Figure 55.*

The blanking and drawing punches have now ascended into their normal or initial position, and the next step in the operation is the transferral of the shell in the left hand spring carrier 65 from the position seen in full lines in Figure 22 into the position seen in dotted lines in said figure. This is effected by means of the mechanism best seen in Figure 5, comprising the slide 101 upon which the left-hand shell carrier 65 is mounted, the roller 103 and the cam 104, it being apparent that as said cam is rotated, the slide 101 and the shell carrier will be moved to the right of the position seen in Figure 5, until the jaws of the shell carrier are in alignment with the spring pusher 105, the parts now appearing as seen in Figure 55. The simultaneous movement of the right-hand or bottom shell carrier 98 to position the same as seen in Figure 55 is effected by means of the mechanism seen at the right of Figure 5, comprising the slide 107, the roller 109 and the cam 110. The two shell carriers are now in the center of the machine and in the position seen in Figures 48, 54 and 55.

At the instant the left hand shell carrier 65 reaches its extreme right hand position, as seen in Figure 54, the right hand periphery of the shell 63 is pressed firmly against the concavity 96 of the bridge 97, thereby temporarily frictionally gripping the shell, while the spring pusher is functioning, which is an important feature in practice, since it ensures the positive retention of the shell in position while the spring is being forced therein.

(g) *The formation and transferral of the finished spring 217 into the position seen in Figure 55 in alignment with the spring pusher and shell.*

The wire 113 is intermittently propelled or advanced by means of the propelling and actuating mechanism seen in Figures 3, 6 and 7, it being apparent that the rocking of the lever 129 effects the actuation of the connecting link 136, whereby the proper movements are imparted to the cam member 140. The wire 113 having been propelled or advanced to the desired extent, the same is momentarily clamped between the blocks 157 and 158, see Figures 7 and 9ª, the temporary pinching or clamping action upon the wire 113 being effected by means of the lever 152 and the screw 154ˣ seen in Figures 3, 7 and 9ª. During the period that the wire is at rest, the same assumes the position seen in Figure 24, the left-hand end of the wire being situated in the bell mouth 193, and the rectilinear portion of the wire being supported upon the rectilinear aligning faces 188 and 191 of the forming tools 185 and 186.

The parts are now in the position seen in Figure 24, and in the next step the clamping member 176 advances from the position seen in Figure 24 into the position seen in Figure 25 and clamps the wire against the convex face of the former 168. A further forward advance movement of the forming tools 185 and 186 from the position seen in Figure 25 to the position seen in Figure 26 effects first the shearing of the wire by means of the cutting edge 187 and as the parts advance into the position seen in Figure 26, the jaws 190 and 195 move towards each other from the position seen in Figure 26 into the position seen in Figure 28, thereby forming the shouldered portions 199 and the legs 200, as seen in Figure 29.

During the period that the jaws 190 and 195 have been closing, the back former 201 has been advancing from the position seen in Figure 26 into the position seen in Figure 28, the tongue 204 moving into the space between the legs 200.

In the next step, the jaws 190 and 195 have opened and the back former 201 has advanced further into the concavity of the former 168, so that in the final step of forming the spring, the parts appear as seen in Figure 30 and in the enlarged view in Figure 32.

The back former 201 next moves to the rear of the machine away from the vertical former 168, and the front clamping device 176 moves towards the front of the machine and the finished spring 217 is now completed and momentarily supported upon the upper end of the former 168.

The mechanism whereby the back former 201 is operated will be best understood from Figures 3, 4 and 36.

Especial attention is directed to the function of the clamping device 176, as it will be seen that by its employment, the wire is clamped against the front convex face of the former 168 throughout the entire operation whereby the straight portion 196 is formed into the U-shaped portion 197 and then into the shape seen in Figure 29 and then into the ultimate spring 217, seen in Figure 31, which is a very important feature in practice, as it ensures all the finished springs 217 being standard and uniform.

The operation of the clamping member 176 will be understood from Figures 3, 11 and 32, the cam 177 effecting the desired reciprocations of the slide 179 at the proper intervals and the proper position of said slide and its roller 178 with respect to the cam 177 being assured at all times by means of the spring 182 seen in Figure 11. The opening and closing of the jaws 227 which carry the forming tools 185 and 186 will be understood from Figures 3, 24, 26, 28 and 30, the cam 218 by its contact with the roller 220 effecting the forward and back movement of the jaws 227 and their adjuncts, while the side cams 231 effect the opening and closing of the jaws 227 and the forming tools 185 and 186 at the proper intervals, as is evident.

The spring 232 causes the jaws at all times instantly and accurately to function, and the stops 234 in conjunction with the adjusting screws 233 enable any desired adjustments to be instantly and accurately made.

The manner of assembling the jaws 227 with respect to the slide 223 and the manner of assembling the adjusting block 222 and effecting the desired adjustments will be understood from the left-hand portion of Figure 4 and from Figure 48, the slide 223 and its adjuncts being held in the proper position with respect to the cam 218 by means of the springs 236 best seen in Figures 4 and 48.

At this stage of operation, we may assume that the back former 201 has receded from the former 168 and the forming tools 185 and 186 have opened, as seen in Figure 32 and the front clamping member 176 has been moved away from the former 168 towards the front of the machine. The former 168 next descends into the position seen in Figure 33, carrying with it the finished spring 217, which is stripped therefrom and is received in the slots 238 of the spring carrier 239 seen in Figure 33. The spring carrier 239 is next actuated to position the spring 217 as seen in Figure 55, said spring carrier being actuated by the mechanism seen in Figures 3, 9 and 10 and comprising the cam 244, the roller 245, the slide 246, the eccentric stud, the block 251, the lever 254, the block 257, the pin 258 and the dove-tailed slide 241$^{xx}$, the upright portion 240$^x$ of which carries the spring carrier 239, as will be understood from Figure 10.

It will consequently be seen that the reciprocation of the slide 246 will impart an oscillatory movement to the lever 254 thereby imparting the desired reciprocation to the spring carrier 239. The spring 217 may now be assumed to be in position seen in Figure 55, and just prior to said spring assuming the position seen the small slide 240 best seen in Figures 48 and 52 has contacted with the cross-piece 241 and has imparted a slight tension or pressure upon the legs 200 of the finished spring 217, as will be understood from Figure 48. This is an important function in my machine, since the legs 200 are slightly momentarily pressed inwardly so as to enable the spring pusher 105 effectively to perform the first step of the transferral of the spring 217 into the shell 63 as seen in Figures 56 and 57.

(h) *Causing the descent of the spring pusher to force the spring from the spring carrier, into the shell, and, lastly transfer the assembled spring and shell into the lower or right-hand shell carrier after which the spring pusher ascends to its normal or initial position.*

The parts being now in the position seen in Figure 55, the spring pusher 105 next moves into the position seen in Figure 56, thence into the position seen in Figure 57, and lastly, into the position seen in Figure 58.

Especial attention is called to the operation and function of the bottom shoulder 264 on the spring pusher 105, which is best seen in Figures 59 and 60, the function of said shoulder being to engage the outer curved portion 265 of the spring, whereby substantially the entire area of the latter is acted on by said shoulder, so that the spring is properly and accurately positioned within the shell 63, so that the parts appear as seen in Figure 62.

The spring pusher having descended to the position seen in Figure 58, is next caused to ascend to its normal or initial position, this being effected by the cam 272, the roller 271, the lever 268 and the plunger 266, which carries said spring pusher 105 at its bottom end, said plunger 266 and spring pusher having an up and down movement in the gate 82 but independently thereof, (see Figures 5 and 13).

At this stage, the spring pusher 105 has transferred the shell 63 with the assembled spring therein into the jaws of the lower or right-hand carrier 98, as will be understood from Figure 58.

(i) *Moving the lower or right hand shell carrier with the assembled spring and shell to the right into alignment with the lifter and rolling punch.*

This is effected by means of the mechanism seen in Figure 5 comprising the cam 110 and the slide 107, which carries the right-hand shell carrier 98, and we may now assume that the shell in the latter is in vertical alignment with the rolling punch 106 and the lifter 274.

(j) *Causing the descent of the rolling punch to the top of the right hand shell carrier.*

The rolling punch 106 is fast in the gate 82 and said gate, rolling punch and their adjuncts are caused to descend by the mechanism best seen in Figure 4 and comprising the cam 93, the roller 92 and the lever 90, fulcrumed at 91, whose forward end 89 engages the seat 88 in the back of the gate 82, it being apparent that the gate 82 and the rolling punch 106 move up and down as a unit.

(k) *Causing the ascent of the lifter to force the shell upwardly from the right hand shell carrier against the rolling punch to roll the edge of the shell inwardly, thereby clamping the outer curved portion of the spring in position.*

The rolling punch 106 being now down in the position seen in Figure 67, the lifter 274 moves upwardly into the position seen in said figure, the upward movement of the lifter being effected by means of the plunger 284, the yoke 285, the lever 287 and its co-acting cam, as will be understood from Figure 5.

(l) *Elevating the rolling punch and leaving the finished socket or female member on the lower end of the vertical stationary stripper.*

The parts being now as seen in Figure 67, the next step in the operation is the lifting of the rolling punch 106 into the position seen in Figure 68. This is effected by the engagement of the front end 89 of the lever 90 with the gate 82 in the manner hereinbefore described, it being apparent that as said gate moves upwardly, the rolling punch 106 which is fast therein simultaneously moves upwardly. As the rolling punch 106 rises into the position shown in Figure 68, the stationary, vertical stripper 277 functions to position the finished socket or female member on the lower end of said stripper, the parts now appearing as seen in Figure 68.

(m) *Causing the descent of the lifter to a point below the right hand shell carrier and the actuation of the horizontal final stripper.*

The lifter 274 next moves from the position seen in Figure 68 to the position seen in Figure 69 below the path of the right-hand or lower shell carrier 98. This actuation of the lifter is effected by means of the mechanism seen in Figure 63, the function of the spring 286 and of the adjusting screw 294 being apparent from said figure.

In the practical use of my device, the finished socket members after being stripped as seen in Figure 68 usually drop from the bottom of the vertical stationary stripper 277, but in case they do not, the horizontally moving forked stripper 111 positively effects the stripping of the finished socket member, as the same advances to straddle the vertical stripper as seen in Figure 69 and the continued advance movement of said horizontal stripper by reason of its bevelled under side 281, positively effects the stripping of the finished socket member, as will be understood from Figure 69.

The horizontal forked stripper 111 is mounted upon the slide 107, as will be understood from Figures 5, 63 and 69, and obviously moves in unison with said slide and with the shell carrier 98 also carried thereby.

It will be apparent to those skilled in the art that it is essential in the operation of automatic machines of this character which produce small articles of the character described that the machine be as compact as possible and that so far as possible the movement of the various parts be in a rectilinear line, and it is also essential that the extent of these movements be as limited as possible in order that time may be saved in the transferral or assembly of the various elements which are handled.

It will be seen from Figure 3 that the principal operative elements of my device are arranged in a very compact manner, the shafts 3, 21, 10 and 15 being arranged at right angles to each other in as close proximity to the housing as is possible, and the various cams, slides, levers and their coacting elements which are actuated by said shafts are arranged in every instance to give a rectilinear movement to the coacting elements which are actuated.

It is also a desideratum in automatic machines of this character to obtain a maximum output in a minimum space of time, or in other words, to be enabled to run these machines at as high speed as possible, which I have accomplished by the design and contour of the various cams, which I employ, said cams being laid out in such a way that high speed is ensured, a machine constructed in accordance with my invention being capable of producing 125 of the finished socket members per minute.

I am aware of the patent to Kiessling, No. 1,326,132, and my machine is differentiated therefrom in the following particulars:—

In the Kiessling machine, the feed of the preformed strip is effected by means of a relatively long reciprocating rod having the pawl loosely mounted on the end thereof. In my device, the feeding of the preformed strip is effected by means of a rock arm mounted on a rock shaft, which carries the pawl, which is downwardly pressed upon the work by the spring 47 as seen in Figure 13, and furthermore, any desired adjustment of the throw of said pawl 40 can be readily effected in my device by the adjusting screw 29 seen in Figure 12.

It is also very important in a rapidly operating automatic machine of this character for the actuating mechanism correctly and positively to engage the work, which I effect by means of the spring and pin construction seen in Figure 13.

In the Kiessling machine the action of the blanking and drawing punches is effected by means of a pair of eccentrics having a continuous rotary motion, whereas in my machine the blanking punch is fast in my gate 82, while the drawing punch is actuated by means of an independent plunger 80 and a lever and cam movement, best seen in Figure 2.

In the Kiessling machine, it will be apparent that from his employment of a double eccentric, it necessarily follows that there is a continuous movement imparted to his blanking punch and his drawing punch.

In my invention the operation of these punches is different for the reason that my drawing punch is operated by the cam 67 seen in Figure 2 and having a dwell and by reason of the contour of said actuating cam, the telescoping drawing punch is temporarily held against the strip 44, as seen in Figure 19, during the period that the blanking punch is functioning as seen in Figure 20. By this construction, each teat 43 is momentarily properly centered by the drawing punch 57 while the blanking punch 59 is functioning which results in the blanking punch cutting all its disks of one uniform and standard dimension.

My drawing punch has the function of transferring the finished cup or shell 63 from the die to the left hand shell carrier 65 as will be understood from Figure 22.

In the Kiessling machine, he employs a rotary dial which is intermittently rotated by a ratchet and pawl mechanism, which necessitates an additional locking mechanism to temporarily lock the dial.

In my invention, I employ for the reception of the formed shell, the left hand shell carrier 65 whose movement is always in a rectilinear line and not in a circular line, as is the case in the Kiessling machine. By the employment of a shell carrier moving in rectilinear lines and positively actuated by a slide, lever, and a cam, I obtain a much greater speed than can be obtained in the Kiessling device, and in addition I dispense with all mechanisms necessary to rotate or actuate the dial intermittently and to lock it in position, which means in practice a loss of speed.

It will be obvious to those skilled in the art that a shell carrier composed of a dial as seen in the Kiessling patent involves the turning or finishing of a circular body and requires the spacing of the peripheral notches and the holes for the reception of the shells to be most accurately laid out, and in addition the utmost accuracy is required in positioning the pawl for operating the dial and the locking devices coacting with the dial.

In my device no such expense of manufacture or extreme accuracy is necessary since each of my shell carriers comprise merely a bar of metal with a longitudinal cut therein and the outer jaws, which can be produced at an expense of about two dollars.

It will be apparent to those skilled in the art that in view of the work which the drawing punch is called upon to perform, that the same must be occasionally ground off and re-faced, which I am enabled readily to do in my machine by reason of the adjustment provided as seen in Figures 2, 2$^a$ and 2$^b$, it being apparent that by the adjustment of the bar 75, seen in Figures 2$^a$ and 2$^b$, I can readily adjust the throw of the drawing punch after the end of the same has been ground off so that the drawing punch can be used for as long a period as one year.

In the case of Kiessling's drawing punch, no such adjustment as I disclose is permitted by reason of the double eccentric action which he employs.

In lieu of the dial or circular shell carrier of the Kiessling machine, which obviously has a rotary movement, I employ, to effect the transfer of the formed shell, shell carriers, which move in right lines and in alignment with respect to each other and which are constructed and operated in a manner entirely different from Kiessling's, since my shell carriers are operated in a rectilinear line, as distinguished from the circular movement of Kiessling's dial and in addition my shell carriers are operated by simple mechanical movements consisting of slides and cams.

In the Kiessling machine, the blanking and drawing punches are actuated by a double eccentric, whereas in my machine the blanking punch is actuated by and in unison with the gate 82, while the drawing punch is actuated by a cam, lever and plunger which latter has a movement in said gate independently thereof.

In the Kiessling machine, the rolling punch is stationary, whereas in my machine the rolling punch is fast in the gate and moves in unison therewith and has an up and down vertical movement.

In the Kiessling machine, the shell is supported in the rotary dial, then the rotary dial intermittently actuated by the ratchet and pawl mechanism to position the shell in alignment with the spring pusher, and after the spring is assembled, the rotary dial is again intermittently actuated to position the assembled spring and shell with respect to the rolling punch.

The Kiessling rolling punch is stationary and after the Kiessling lifter has been vertically moved, to roll the shell, a further intermittent movement of the Kiessling dial is required in order to transfer the finished socket member out of the range of the punches and lifter.

There are no such corresponding elements in my machine, since I collocate in the gate in the center of my machine both the blanking punch and the drawing punch, the spring pusher, the rolling punch, and the stationary vertical stripper and the blanking punch 59 and the drawing punch 106 are fast in the gate and reciprocate in unison therewith.

My drawing punch 57 and the spring pusher 105 have vertical reciprocatory movements in the gate, but entirely independent thereof, which constructions are not present in the Kiessling machine.

In my machine, the assembled spring and shell are transferred in a rectilinear line to the rolling punch, whereas in the Kiessling machine, all of the movements of the shell are in a curvilinear or circular line.

In the Kiessling machine, the shell, after being assembled in a rotary dial, has a curvilinear movement imparted thereto to position the shell in alignment with the spring whereas in my machine the drawing punch functions, as seen in Figure 22, to position the shell in my rectilinear moving left-hand shell carrier 65 and the assembly of the spring within the shell is effected by a spring pusher which functions not only to position the spring in the shell, but also to transfer the assembled shell and spring into the lower or right-hand shell carrier 98, which function and elements are not present in the Kiessling machine.

In the Kiessling machine, no provision is made for adjusting the throw or upward movement of the lifter, whereas in my device, I employ the yoke 285 and the adjusting screw and their adjuncts, whereby the throw of the lifter can be readily adjusted for various classes of work.

In the Kiessling machine, the rolling punch which effects the final operation on the shell is stationary, whereas my rolling punch is movable, being mounted on the gate and moves in unison therewith.

In the Kiessling machine, after the shell has been rolled, he employs a stripper to force the finished socket member back into a rotary dial and a subsequent rotary movement of the dial is necessary to permit the finished member to be stripped therefrom, all of which operations are dispensed with in my device, since upon the ascent of the vertically movable rolling punch, a stationary vertical stripper strips the socket member therefrom, as seen in Figure 68, and in the event that it is necessary, the horizontally moving stripper 111 completes the stripping operation, all of which members are absent from the Kiessling machine.

I make no claim per se herein to the formation of the U-shaped wire 197, seen in Figure 27, or to the mechanism or jaws effecting this, since this feature is old in various machines for forming wire eyes for female apparel and has also been used in jack chain and button-back machines.

In the Kiessling machine, no provision is made for positioning the free end of the wire in a bell mouth prior to the cutting.

This is effected in my device by means of a bell mouth best seen in Figure 26ª, wherein it will be apparent that the free end of the wire is effectively held in position, and after the wire is thus positioned, the clamp 176 advances from the position seen in Figure 24 into the position seen in Figure 25, whereby it will be apparent that the wire is initially effectively clamped against the former 168, prior to the shearing operation, which is shown in Figure 25 as just about to take place.

It will thus be seen that the clamping member 176 functions from the time the parts appear as seen in Figure 25 throughout the entire spring forming operation, or until the finished spring is completed, as seen in Figure 30, which features are not present in the Kiessling machine.

In the Kiessling machine, no adjustment is provided for the front portion of the jaws carrying the spring forming tools, whereas in my device, I provide the button headed adjusting screw 230, whereby any desired adjustment to the jaws 190 and 195 can be readily effected. In the Kiessling spring pusher, no provision is made for effectively engaging the curved portion of the spring, when it has been assembled in the shell, whereas in my device, I employ the shoulder 264, which performs a very useful and important function in this connection.

The Kiessling back former differs from the back former I employ, which is shown in Figures 37, 38 and 39, since I employ the central resilient tongue and the outer integral tongues 210, whereas the Kiessling former is an integral member having a forward recess therein.

It will be further apparent, as has been explained, that the Kiessling dial not only moves in a curvilinear line, but also has an intermittent movement effected by the ratchet and pawl mechanism, in order to effect the transferral of the shell to the various mechanisms.

It is obvious that there is a loss of speed in the employment of a dial of this character as compared with the spring carriers I employ having but a very small range of movement, since the distance in my machine from the blanking and drawing punch seen in Figure 5 to the spring pusher 105 is only one and one quarter inches, while the distance from the spring pusher 105 to the rolling punch 106 is also one and one quarter inches, wherefrom it will be seen that the entire distance travelled by the shell from the blanking and drawing punches to the rolling punch is but two and one-half inches and this distance is traversed by the mechanism which I employ in less than one-half of a second, so that it is obvious that the speed of production of my machine is greatly increased over that of a machine where the shell has to travel in a curvilinear line intermittently by a ratchet and pawl mechanism.

In the Kiessling device, the spring pusher is a V-shaped wedge, whereas my spring pusher has a convex bottom terminal and a lower, horizontal circumferential shoulder.

It will now be apparent that I have devised a novel and useful machine for making snap fasteners, which embodies the features of advantage enumerated as desirable in the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a machine of the character described, shell forming means, spring assembling means, and shell rolling means, said three instrumentalities being arranged in a rectilinear line, in combination with a shell carrier for transferring the shell to the spring assembling means in a rectilinear line, and a second shell carrier for transferring the assembled shell and spring to the rolling means in a rectilinear line.

2. In a machine of the character described, a pair of shell carriers each having resilient jaws, means for moving said shell carriers in a rectilinear line towards and away from each other, means for depositing a formed shell into the jaws of one of said shell carriers, means for assembling a spring in the formed shell, and forcing the assembled spring and shell downwardly into the jaws of the other shell carrier.

3. In a machine of the character described, shell forming means, a spring assembling means, shell rolling means all arranged in a rectilinear line, a left hand shell carrier having resilient jaws for transferring the shell to a point in alignment with the spring assembling means, and a right hand shell carrier positioned below said left hand shell carrier for transferring the assembled spring and shell to a point in alignment with said shell rolling means.

4. In a machine of the character described, shell forming means, spring assembling means, shell rolling means all arranged in a rectilinear line, a left hand shell carrier having resilient jaws for transferring the shell to a point in alignment with the spring assembling means, and a right hand shell carrier positioned below said left hand shell carrier for transferring the assembled spring and shell to a point in alignment with said shell rolling means, in combination with means for actuating said shell carriers in a rectilinear line.

5. In a machine of the character described, shell forming means, spring assembling means, shell rolling means all arranged in a rectilinear line, a left hand shell carrier having resilient jaws for transferring the shell to a point in alignment with the spring assembling means, and a right hand shell carrier positioned below said left hand shell carrier for transferring the assembled spring and shell to a point in alignment with said shell rolling means, in combination with jaws on said left hand shell carrier having their outer portions cut away and a bridge adapted to have a shell in said jaws pressed against it, when said jaws are in alignment with said spring assembling means.

6. In a machine of the character described, a shell carrier having resilient jaws, means for forming a shell, means for forcing the formed shell downwardly into said jaws, a spring pusher, means for moving said jaws in a rectilinear line into alignment with said spring pusher, means for transferring a spring into alignment with said spring pusher, a second shell carrier having jaws adapted to be positioned below said first mentioned jaws, and means for actuating said spring pusher to assemble a spring in a shell and to transfer the latter to the jaws of said second shell carrier.

7. In a machine of the character described, a shell carrier having resilient jaws, means for forming a shell, means for forcing the formed shell downwardly into said jaws, a spring pusher, means for moving said jaws in a rectilinear line into alignment with said spring pusher, means for transferring a spring into alignment with said spring pusher, a second shell carrier having jaws adapted to be positioned below said first mentioned jaws, and means for actuating said spring pusher to assemble a spring in a shell and to transfer the latter to the jaws of said second shell carrier, in combination with shell rolling means and means for actuating the jaws of said second shell carrier in a rectilinear line to a point in alignment with said shell rolling means.

8. In a machine of the character described, a blanking punch, a drawing punch, a lower die, a left hand shell carrier, having jaws adapted to be positioned below said punches, means for enabling said drawing punch to force a formed shell downwardly from said lower die into the jaws of said shell carrier, a right hand shell carrier positioned below said left hand carrier, means for actuating said shell carriers in a rectilinear line, a spring pusher, means for forming a spring and for conveying it into alignment with said spring pusher, means for depressing said spring pusher to force the assembled shell and spring into the jaws of said right hand shell carrier, and a shell rolling means, said right hand shell carrier being adapted to transfer the assembled spring and shell to a point in alignment with said shell rolling means.

9. In a machine of the character described, a slide, means for actuating it, jaws fulcrumed on said slide, spring forming tools, carried by the forward ends of said jaws, one of said tools having a bell mouth to receive and position the free end of the wire to be bent, a quill, a cutting edge formed on the other of said forming tools in proximity to said quill, inwardly projecting wire bending jaws on the forward ends of said tools, a vertically movable former, having a front convex face, a clamp movable against said convex face, in advance of the closing of said forming tools and a back former movable in a horizontal plane towards said vertical former.

10. In a machine of the character described, a slide, means for actuating it, jaws fulcrumed on said slide, spring forming tools, carried by the forward ends of said jaws, one of said tools having a bell mouth to receive and position the free end of the wire to be bent, a quill, a cutting edge formed on the other of said forming tools in proximity to said quill, inwardly projecting wire bending jaws on the forward ends of said tools, a vertically movable former, having a front convex face, a clamp movable against said face in advance of the closing of said forming tools and a back former movable in a horizontal plane towards said vertical former and having a movable tongue, in combination with means for imparting intermittent movements to said back former towards said vertical former.

11. In a machine of the character described, a slide, means for actuating it, jaws fulcrumed on said slide, spring forming tools, carried by the forward ends of said jaws, one of said tools having a bell mouth to receive and position the free end of the wire to be bent, a quill, a cutting edge formed on the other of said forming tools in proximity to said quill, inwardly projecting wire bending jaws on the forward ends of said tools, a vertically movable former, having a front convex face, a clamp movable against said convex face, in advance of the closing of said forming tools and a back former movable in a horizontal plane towards said vertical former and having a movable tongue, in combination with means for imparting intermittent movements to said back former towards said vertical former, said spring forming tools and their jaws being open during the final forward movement of said back former.

12. The combination of a vertical former, having a convex front face, a clamping member therefor, spring forming side tools adapted to close towards said vertical former, a back former movable horizontally towards said vertical former and having a movable tongue, and means for imparting a plurality of intermittent forward movements to said back former towards said vertical former, the final forward movement of said back former, occurring while said spring forming side tools are open.

13. The combination of a vertically movable former, a clamp coacting therewith, side spring forming tools, having inner jaws thereon, a back former having a movable tongue and means for giving said back former an intermittent forward movement towards said vertical former, the final forward movement of said back former occurring when the jaws on said spring forming tools are open.

14. In a machine of the character stated, wire forming mechanism comprising a vertically movable former of U-shape in cross section and having a concave rear wall and a convex front face against which the wire is adapted to contact, a pair of spring forming jaws arranged to co-operate with said former, one of said jaws having a wire shearing edge, a clamp movable against said convex face prior to the closing of said jaws, a reciprocating slide on which said jaws are mounted, and a quill for the wire having its inner extremity in proximity to said shearing edge when said jaws are open, and a back former having a movable tongue.

15. In a machine of the character stated, wire forming mechanism comprising a vertically movable former of U-shape in cross section and having a concave rear wall and a convex front face against which the wire is adapted to contact, a pair of spring forming jaws arranged to co-operate with said former, one of said jaws having a wire shearing front edge, a reciprocating slide on which said jaws are mounted, a quill for said wire having its inner extremity in proximity to said shearing edge when said jaws are open, a clamping device movable against the front convex face of said vertical former, and functioning to clamp the wire prior to the closing of said forming jaws, and a back former movable towards and co-acting with the concave rear wall of said vertical former, and a tongue movable toward and from the concaved rear wall of the vertical former.

16. In a machine of the character stated, wire forming mechanism comprising a vertically movable former of U-shape in cross section and having a concave rear wall and a convex front face against which the wire is adapted to contact, a pair of spring forming jaws arranged to co-operate with said former, one of said jaws having a front wire shearing edge, a reciprocating slide on which said jaws are mounted, a quill for said wire having its inner extremity in proximity to said shearing edge when said jaws are open, a clamping device movable against the convex face of said former, and functioning to clamp the wire prior to the closing of said forming jaws, a back former having a resilient central tongue and two shorter side tongues, and means for actuating said back former towards and away from said vertical former.

17. In a machine of the character stated, wire forming mechanism, comprising a vertically movable former of U-shape in cross-section and having a concave rear wall and a convex front face against which the wire is adapted to contact, a pair of spring forming jaws arranged to co-operate with said former, one of said jaws having a front wire shearing edge, a reciprocating slide on which said jaws are mounted, a quill for said wire having its inner extremity in proximity to said shearing edge when said jaws are open, a clamping device movable against the convex face of said vertical former, and functioning to clamp the wire prior to the closing of said forming jaws, a back former having a movable tongue, and means for giving said back former an intermittent forward movement, the final forward movement of said back former into the concavity of said vertical former occurring when said spring forming jaws are opened.

18. In a machine of the character stated, wire forming mechanism, comprising a vertically movable former of U-shape in cross-section and having a concave rear wall and a convex front face against which the wire is adapted to contact, a pair of spring forming jaws arranged to co-operate with said former, one of said jaws having a front wire shearing edge, a reciprocating slide on which said jaws are mounted, a quill for said wire having its inner extremity in proximity to said shearing edge when said jaws are open, a clamping device movable against the convex face of said vertical former, and functioning to clamp the wire prior to the closing of said forming jaws, a back former, having a resilient central tongue and two shorter side tongues, and means for giving said back former an intermittent forward movement, the final forward movement of said back former into the concavity of said vertical former occurring when said spring forming jaws are opened.

19. In a device of the character stated, wire forming mechanism comprising a vertically movable U-shaped former having a concave rear wall and a convex front face, a clamp adapted to be moved against said convex front face, a pair of jaws cooperating with said vertical former, one of said jaws having a front wire shearing edge, a reciprocating slide on which said jaws are mounted, a quill for guiding the wire and having its inner extremity in proximity to said shearing edge when said jaws are open, said clamp functioning to clamp the wire prior to the closing of said jaws thereon, and a bell mouth on one of said jaws for positioning the free end of said wire during the bending operation.

20. In a device of the character stated, a vertically movable U-shaped former having a concave rear wall and a convex front face, a horizontally movable back former provided with a resilient central tongue and a pair of rigid side tongues of lesser length, spring forming jaws, means for moving said spring forming jaws forwardly, means for closing said spring forming jaws towards said vertical former, and means for imparting to said back former an intermittent forward movement towards said vertical former.

21. In a device of the character stated, a vertically movable U-shaped former having a concave back wall and a convex front face, a horizontally movable back former provided with a resilient central tongue and a pair of rigid side tongues of lesser length, spring forming jaws, means for moving said spring forming jaws forwardly, means for closing said spring forming jaws towards said vertical former, and means for imparting to said back former an intermittent forward movement, the final forward movement of said back former into the concave back wall of said vertical former occurring while said spring forming jaws are open.

22. In a device of the character stated, a shaft, an outside cam mounted thereon, side cams on said outside cam, a slide carrying a roller adapted to contact with said outside cam, jaws fulcrumed on said slide and having their ends in proximity to and actuated by said side cams, adjusting screws coacting with said side cams, stops on said slide, adjusting screws passing horizontally through said jaws and having their inner ends adapted to contact with said stops, spring forming tools mounted on the forward ends of said jaws, a vertically movable former, and a horizontally movable rear former, having a central resilient tongue.

23. In a machine of the character stated, a rectilinear moving shell carrier for the reception and actuation of the formed shells, a spring carrier for holding the completed springs in a position above said shells, in which position the inside members of the springs are spaced apart a distance less than the width of the teats on said shells, reciprocating mechanism comprising a spring pusher for pushing the springs bodily out of said spring carrier into the shells, and a set back shoulder on said spring pusher and extending partially around it for advancing the curved portion of the springs into their shells.

24. In a machine of the character stated, a rectilinear movable shell carrier having resilient jaws, spring forming devices, mechanism operating in a different plane from said spring forming devices for moving the springs to a position in alignment with the shell carrier jaws, a spring pusher having a set back shoulder thereon for bringing the shells and springs together, so that the springs are assembled in said shells, and means for actuating said shell carrier in a rectilinear line towards the spring assembling devices.

25. In a machine of the character stated, a rectilinear movable shell carrier having resilient jaws, spring forming devices, mechanism operating in a different plane from said spring forming devices for moving the springs to a position in alignment with the shell carrier jaws, a spring pusher having a set back shoulder thereon for bringing the shells and springs together, so that the springs are assembled in said shells, and means for actuating said shell carrier in a rectilinear line towards the spring assembling devices, in combination with shell rolling means, and a second shell carrier movable in a rectilinear line for conveying the assembled springs and shells to said rolling means.

26. In a machine of the character stated, means for assembling springs formed with separable portions in shells having teats, a shell carrier having resilient jaws movable in a rectilinear line for conveying a shell into alignment with said spring assembling means, and a spring carrier for moving the completed springs into alignment with said spring assembling means, the latter operating by its movement to spread the separable members of the springs and having a set back horizontal shoulder to exert a downward pressure upon the curved portion of said springs, said shell carrier being positioned in alignment with the spring assembling devices while the springs are assembled in said shells.

27. In a machine of the character stated, a shell carrier movable in a rectilinear line and having resilient jaws for the reception of the formed shells, mechanism for forming the completed springs, a spring carrier for conveying the springs away from the spring forming mechanism to a position for delivery to the shells, in which position the inside members of the springs are spaced apart a distance less than the width of the teat portion of said shells, and means mounted independently of the shell conveying means for positioning the springs in the cups, said spring positioning means being provided with a set back circumferential shoulder adapted to engage the curved portion of a spring during the act of assembling a spring within its shell.

28. In a machine of the character stated, a shell carrier movable in a rectilinear line and having resilient jaws for the reception of the formed shells, mechanism for forming the completed springs, a spring carrier for conveying the springs away from the spring forming mechanism to a position for delivery to the shells, in which position the inside members of the springs are spaced apart a distance less than the width of the teat portion of said shells, and means mounted independently of the shell conveying means for positioning the springs in the cups, said spring positioning means being provided with a set back circumferential shoulder adapted to engage the curved portion of a spring during the act of assembling a spring within its shell, in combination with shell rolling means, a second shell carrier for conveying the assembled spring and shell to said rolling means, and means for actuating said second shell carrier in a rectilinear line.

29. In a machine of the character stated, a shell carrier having resilient jaws adapted to receive a formed shell, means for actuating said shell carrier in a rectilinear line, means for suppporting a spring above the shell in a position in which its inside members are spaced apart a distance less than the width of the teat portion of the shell, means for pushing the spring bodily out of said spring supporting means into the shell, comprising a spring pusher, having its extremity provided with a seat which surrounds the teat portion of the shell near the end of its advancing movement, and a circumferential bottom set-back shoulder thereon, adapted to engage the curved portion of the spring, shell rolling means, a second shell carrier located below said first-mentioned shell carrier and adapted to receive the assembled shell, and spring, means for moving said second shell carrier in a rectilinear line to the shell rolling means, and a stationary vertical stripper coacting with said shell rolling means to strip the finished article therefrom.

30. In a machine of the character stated, a shell carrier having resilient jaws for supporting a formed shell, means for actuating said shell carrier in a rectilinear line, means for supporting a completed spring above said shell in a position in which its inside members are spaced apart a distance less than the width of the teat portion of the shell, a spring pusher for assembling the completed spring in the shell, which cooperates with the teat portion of the shell to spread the inside members of the spring during said positioning operation, a set back shoulder on said spring pusher for engaging the curved portion of said spring during the assembling operation, a second shell carrier, and means for moving the latter in a rectilinear line, said second shell carrier being adapted to receive the assembled spring and shell upon the final extreme downward movement of the spring pusher.

31. In a machine of the character stated, a shell carrier having resilient jaws for the reception of the formed shells, means for moving said shell carrier in a rectilinear line, mechanism for forming completed springs and conveying them to a position in alignment with the shells in which position the inside members of the springs are spaced apart a distance less than the width of the teat portion of said shells and reciprocating spring pushing mechanism provided with a set back circumferential shoulder engaging the curved portion of the springs for pushing the latter out of said conveying means and assembling them in the shells.

32. In a machine of the character stated, a shell carrier provided with resilient jaws, means for moving the latter in a rectilinear line to receive and support the formed shells, conveying means for receiving springs, which have been bent to their final shape and moving them successively to a position in alignment with the jaws of said shell carrier in which position the inside members of the springs are spaced apart a distance less than the width of the teat portions of said shells, and spring assembling means for bringing the shells and springs together so that the springs are contained in said shells, said spring assembling means having a set-back horizontal shoulder engaging the curved portion of the springs when positioning the latter in said shells.

33. In a machine of the character stated, means for assembling springs formed with separable portions into shells formed with laterally slit teat portions, so that the springs are contained in said shells, said means comprising a spreading device which operates by its movement to spread the separable portion of the springs, said spreading device having a set back shoulder adapted to engage the curved portions of said springs, a shell carrier for conveying the shells to a point in alignment with the completed springs, and means for operating said shell carrier in a rectilinear line towards and away from the spring assembling means.

34. In a machine of the character stated, means for assembling springs formed with separable portions into shells formed with laterally slit teat portions, so that the springs are contained in said shells, said means comprising a spreading device which operates by its movement to spread the separable portion of the springs, said spreading device having a set-back horizontal shoulder adapted to engage the curved portions of said springs, a shell carrier for conveying the shells to a point in alignment with the completed springs, means for operating said shell carrier in a rectilinear line, a second shell carrier for receiving the assembled spring and shell, shell rolling means, and means for transferring an assembled shell and spring to a point in alignment with said shell rolling means.

35. In a machine of the character stated, a shell carrier, means for moving said shell carrier in a rectilinear line into a position to receive a completed spring, means for assembling the shell and spring so that the spring is contained in said shell, shell rolling means, means for moving the assembled shell and spring in a rectilinear line into alignment with said shell rolling means, and a stationary vertical stripper passing through the upper portion of said shell rolling means, in combination with a forked horizontally moving final stripper, secured to the shell carrier and movable in unison therewith.

36. In a machine of the character stated, a spring pusher, a shell carrier, means for operating said shell carrier in a rectilinear line into alignment with said spring pusher, a spring carrier for receiving the completed springs and conveying them in an edgewise direction to a point in alignment with said spring pusher, a second shell carrier into which an assembled shell and spring are pushed by the final movement of said spring pusher, and means for moving said second shell carrier in a rectilinear line away from said spring pusher.

37. In a machine of the character stated, a spring pusher, a shell carrier, means for operating said shell carrier in a rectilinear line into alignment with said spring pusher, a spring carrier for receiving a completed spring and conveying it in an edgewise direction to a point in alignment with said spring pusher, a second shell carrier into which an assembled shell and spring are pushed by the final movement of said spring pusher, shell rolling means, and means for moving said second shell carrier in a horizontal line away from said spring pusher to said shell rolling means for curling inwardly the edge of the shell upon the spring therein.

38. In a machine of the character stated, a spring carrier having an opening therethrough and provided with a seat for a completed spring, a vertically movable U-shaped former having a concave rear wall and a convex front face, means for bending a wire about said former while the latter is in fixed position above said carrier, means for depressing said former through the opening in said spring carrier, whereby the spring is stripped from said former during the descent thereof, a front clamping device, a back former provided with a central resilient tongue and rigid side tongues, and means for actuating said back former.

39. In a machine of the character stated, the combination of a spring carrier having an opening therethrough provided with a recess for receiving a finished spring, a vertically movable U-shaped former having a concave rear wall and a convex front face, means for bending a wire about the former means for bending a wire about the former while the latter is in fixed elevated position above said spring carrier, means for depressing said former through the opening in said spring carrier, whereby the finished spring is stripped therefrom, a spring pusher, means for moving the spring carrier to a point in alignment with said spring pusher, a shell carrier, and means for moving said shell carrier with a shell therein in a rectilinear line to a point in alignment with said spring pusher.

40. The combination of a vertically movable U-shaped former having a concave wall in the rear thereof and a convex front face, means for bending the wire upon the convex face of said former to form a spring, comprising a movable front clamping member fitting the convex front face of said former, side bending members movable towards a different portion of said former, and a back former provided with a resilient central tongue, and rigid shorter side tongues, and means for giving said back former an intermittent movement towards the back concavity of the vertical former, said front clamping member engaging the wire to be bent prior to the closing of the side bending members, and the final movement of said back former occurring while said side bending members are open.

41. In a machine of the character stated, the combination of a vertically movable U-shaped former, having a concave rear wall and a convex front face, means for feeding wire across said convex front face, means for temporarily clamping said wire, means for cutting said wire while clamped, means for bending said wire to a U-shape about said convex front face, means for engaging the end portions of the U-shaped piece of wire and moving them towards each other, a back former provided with a resilient central tongue and a plurality of shorter rigid side tongues for forcing portions of the wire near the ends thereof into the concave wall of the vertical former, and means for giving an intermittent movement to said back former towards said vertical former, the final movement of said back former into the concavity of said vertical former occurring while the side bending devices are open.

42. In a machine of the character stated, a vertically movable U-shaped former having a concave rear wall and a convex front face, means for feeding wire across said convex front face, means for bending the wire to U-shape about said convex face, means for engaging the end portions of the U-shaped wire and moving them towards each other, a back former provided with a central resilient tongue and rigid shorter side tongues for forcing portions of the wire near the ends thereof into the concave wall of said vertical former, mechanism for depressing said former to withdraw it from within the completed spring, a spring carrier for receiving the completed spring, a shell carrier having resilient jaws to receive the socketed shells, a spring pusher, means for moving said shell carrier in a rectilinear line into alignment with said spring pusher, a second shell carrier adapted to receive an assembled spring and shell, and means for moving said second shell carrier in a rectilinear line away from the spring assembling devices.

43. In a machine for forming springs suitable to be introduced into snap fastener shells in which a pair of pivoted jaws coact with relatively fixed bending devices for imparting oppositely disposed bends to a wire which has first been bent U-shape, a movable back former separate from said jaws and having a resilient central tongue and outer rigid side tongues for imparting re-entrant bends to the wire to form a completed spring, the spring legs being received in the spaces between said tongues.

44. In a snap fastener machine, a shell rolling device, a shell carrier for transferring an assembled spring and shell to a point in alignment with said rolling device, the latter comprising an upper punch and a lower lifter, means for initially causing the descent of said punch towards said shell carrier, means for next causing the ascent of said lifter through said shell carrier to roll the upper edge of said shell upon the spring, and a stationary vertical stripper telescoping in said upper punch to strip the finished article therefrom.

45. In a snap fastener machine, a shell rolling device, a shell carrier for transferring an assembled spring and shell to a point in alignment with said shell rolling device, the latter comprising an upper punch and a lower lifter, means for causing the descent of said upper punch, means for causing the ascent of said lifter through said shell carrier towards said punch to roll the upper edge of said shell upon said spring, a stationary vertical stripper telescoping in said upper punch to strip the article therefrom, and a forked final horizontally movable stripper adapted to have its bifurcations straddle said vertical stationary stripper in the final stripping of the finished fastener.

46. In a snap fastener machine, a shell rolling device, a shell carrier for transferring an assembled spring and shell to a point in alignment with said shell rolling device, the latter comprising an upper punch and a lower lifter, means for causing the descent of said punch towards said shell carrier, means for causing the ascent of said lifter through said shell carrier towards said upper punch to roll the upper edge of said shell upon its spring, a stationary vertical stripper telescoping in said upper punch to strip a finished article therefrom, a forked horizontally movable final stripper carried by said shell carrier and adapted to have its bifurcations straddle said vertical stationary stripper in the final act of stripping the shell therefrom, the under side of said horizontally movable stripper being beveled to engage the top edge of the finished fastener.

47. In a machine of the character stated, a gate, shell forming means mounted in said gate, a spring pusher mounted in said gate, a rolling punch carried by said gate, a stationary stripper passing through said rolling punch, said shell forming means, spring pusher and rolling punch being arranged in a rectilinear line, an upper shell carrier for transferring a formed shell to the spring pusher, means for moving said shell carrier in a rectilinear line, a lower shell carrier for transferring the assembled spring and shell from the spring pusher to the rolling punch and means for actuating said lower shell carrier in a rectilinear line.

48. In a machine of the character stated, a gate, shell forming means mounted in said gate, a spring pusher mounted in said gate, a rolling punch carried by said gate, a stationary stripper passing through said rolling punch, said shell forming means, spring pusher and rolling punch being arranged in a rectilinear line, an upper shell carrier for transferring a formed shell to the spring pusher, means for moving said shell carrier in a rectilinear line, a lower shell carrier for transferring the assembled spring and shell from the spring pusher to the rolling punch, and a horizontally movable bifurcated stripper mounted on said lower shell carrier, the bifurcations of said horizontal stripper being adapted to straddle said vertical stripper, when said rolling punch is elevated.

49. In a machine of the character stated, a shell carrier having resilient jaws, spring forming devices, mechanism operating in a different plane from said spring forming devices for moving the completed springs to a position in alignment with the shell carrier jaws, a spring pusher having its lower terminal of convex contour and provided with an axially extending seat and a set-back horizontal circumferential shoulder for bringing the springs and shells together so that the springs are assembled in said shells, means for actuating said shell carrier in a rectilinear line towards the spring assembling devices, shell rolling means, a second shell carrier, and means for actuating said second shell carrier in a rectilinear line from a point in alignment with said spring pusher to a point in alignment with said shell rolling means.

50. In a machine of the character described, an upper and lower shell carrier each having resilient jaws, means for moving said shell carriers in a rectilinear line towards and away from each other, means for depositing a formed shell into the jaws of the upper shell carrier, and a spring pusher for assembling a spring in the formed shell, comprising a plunger having its lower terminal of convex contour and provided with an inner seat and a set-back circumferential shoulder, said spring pusher forcing the assembled spring and shell downwardly into the jaws of the lower shell carrier upon its extreme downward movement.

51. In a machine of the character stated, an upper and lower shell carrier each having resilient jaws, means for moving said shell carriers in a rectilinear line towards and away from each other, means for depositing a formed shell into the jaws of the upper shell carrier, a spring pusher for assembling a spring in the formed shell, comprising a plunger having its lower terminal of convex contour and provided with an inner seat and a set-back circumferential shoulder, said spring pusher forcing the assembled spring and shell downwardly into the jaws of the lower shell carrier upon its extreme downward movement, shell rolling means, and means for positioning said lower shell carrier with the assembled shell and spring in vertical alignment with said shell rolling means.

52. In a machine of the character described, shell forming means, spring assembling means comprising a plunger having its lower terminal of convex contour and provided with an axial seat and a set back horizontal circumferential shoulder, a left-hand shell carrier having resilient jaws for transferring the formed shell to a point in alignment with the spring assembling means, shell rolling means, a right-hand shell carrier positioned below said left-hand shell carrier for transferring the assembled spring and shell to a point in alignment with said shell rolling means, and means for actuating said shell carriers in a rectilinear line.

53. In a machine of the character stated, a spring carrier, a slide upon which said spring carrier is mounted, ways for said slide whereby the latter and said spring carrier are always guided in a rectilinear line, an opening in said spring carrier for the reception of a completed spring, a slide mounted in the extremity of said spring carrier and having a concave face adapted to bear upon and spring towards each other the legs of a completed spring contained in the spring carrier, a transverse cross-piece extending at a right angle to the path of said spring carrier and its slide, the latter being adapted to be pushed inwardly in a right line upon its contact with said cross-piece, whereby said slide in its extreme travel contacts with said cross bar and is pressed inwardly holding the spring firmly, while the spring pusher transfers the spring from the spring carrier into the shell.

54. In a machine of the character stated, a spring carrier having a hole therein, a slide having a concave face therein in the front of said spring carrier, an adjustable cross-piece against which the forward end of said slide is adapted to contact at the extreme end of its forward movement, and means for giving different adjustments to said cross piece to put tension on the spring, while it is being stripped from the spring carrier.

55. In a machine of the character stated, a spring carrier having a hole and a seat therein for the reception of a completed spring, a slide in the forward end of said spring carrier, means for limiting the forward and rearward movements of said slide, a cross bar extending at a right angle to the path of said slide and pivotally mounted at one end and adjustably secured at its other end, an adjusting screw for adjusting the position of said cross piece, a pin carried by said slide, and a spring intermediate said pin and the forward end of said spring carrier.

56. In a machine of the character stated, a spring carrier having a hole therein, and a recess at the bottom of said hole for receiving a completed spring, a slide in the front of said spring carrier, an adjustable cross piece pivotally supported at one end and extending at a right angle to the line of movement of said slide, an adjusting screw for said cross piece, a recess in said slide, and a pin engaging said recess for limiting the movement of said slide.

57. In a machine of the character stated, a spring carrier having a hole therein and a recess at the bottom of said hole for receiving a finished spring, a slide in the front of said spring carrier having a curved inner wall to bear upon and spring towards each other the legs of a spring, means for actuating said spring carrier and slide, an adjustable cross piece extending at a right angle to the line of movement of said slide, and tension devices for pressing said slide forwardly.

58. In a machine of the character stated, shell forming means, spring forming means, spring assembling means, an upper and lower shell carrier for conveying the formed shell, each being provided with jaws, the front ends of the upper jaws being cut away, means for moving said jaws in a rectilinear line into alignment, and a bridge having a concavity juxtaposed to the cut-out portions of said upper jaws, whereby a shell contained in the latter is pressed against said concavity when a spring is forced thereinto, the first carrier conveying the shell from the shell former to the spring inserter and the second carrier taking the socket to the shell roller.

59. In a machine of the character stated, shell forming means, spring forming means, spring assembling means, an upper and lower shell carrier, each being provided with jaws, the front ends of the upper jaws being cut away, means for moving said jaws in a rectilinear line into alignment, and a bridge having a concavity juxtaposed to the cut-out portions of said upper jaws, whereby a shell contained in the latter is pressed against said jaws when a spring is forced thereinto, in combination with shell rolling means, and means for then moving said lower shell carrier with the assembled spring and shell into alignment with said shell rolling means, the first carrier conveying the shell from the shell former to the spring inserter.

HENRY H. CANNON.

Witnesses:
E. HAYWARD FAIRBANKS,
C. D. McVAY.